US007777391B2

(12) United States Patent
Asano

(10) Patent No.: US 7,777,391 B2
(45) Date of Patent: Aug. 17, 2010

(54) ARMATURE, MOTOR AND COMPRESSOR AND METHODS OF MANUFACTURING THE SAME

(75) Inventor: Yoshinari Asano, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 289 days.

(21) Appl. No.: 11/795,381

(22) PCT Filed: Dec. 19, 2005

(86) PCT No.: PCT/JP2005/023256

§ 371 (c)(1),
(2), (4) Date: Mar. 27, 2008

(87) PCT Pub. No.: WO2006/077709

PCT Pub. Date: Jul. 27, 2006

(65) Prior Publication Data

US 2009/0015110 A1    Jan. 15, 2009

(30) Foreign Application Priority Data

Jan. 18, 2005  (JP)  ............... 2005-010397
Nov. 4, 2005   (JP)  ............... 2005-320655

(51) Int. Cl.
*H02K 1/22*   (2006.01)
(52) U.S. Cl. ............... 310/268; 310/208; 310/156.57
(58) Field of Classification Search ............... 310/268, 310/261.1, 254.1, 208, 156.25, 156.57, 156.82
See application file for complete search history.

(56) References Cited

U.S. PATENT DOCUMENTS

| 5,142,181 | A | * | 8/1992 | Newell | ............... 310/268 |
|---|---|---|---|---|---|
| 5,619,087 | A | * | 4/1997 | Sakai | ............... 310/268 |
| 5,907,199 | A | * | 5/1999 | Miller | ............... 310/12.14 |
| 5,982,058 | A | * | 11/1999 | Bustamante et al. | ...... 310/49.12 |
| 6,140,730 | A | * | 10/2000 | Tkaczyk et al. | ............... 310/181 |
| 6,198,182 | B1 | * | 3/2001 | Bustamante et al. | ...... 310/49.47 |
| 6,313,553 | B1 | * | 11/2001 | Gandel et al. | ............... 310/36 |
| 6,509,663 | B2 | * | 1/2003 | Laoun | ............... 310/156.32 |
| 6,664,673 | B2 | * | 12/2003 | Lopatinsky et al. | ........ 310/63 |
| 6,794,783 | B2 | * | 9/2004 | Tu et al. | ............... 310/156.32 |
| 2004/0145270 | A1 | * | 7/2004 | Haydock et al. | ........ 310/268 |

FOREIGN PATENT DOCUMENTS

| JP | H06-070476 U | 9/1994 |
|---|---|---|
| JP | H10-164779 | 6/1998 |
| JP | H10-210720 | 8/1998 |
| JP | 2001-054270 | 2/2001 |
| JP | 2004-052657 | 2/2004 |

* cited by examiner

*Primary Examiner*—Thanh Lam
(74) *Attorney, Agent, or Firm*—Global IP Counselors

(57) ABSTRACT

An armature including magnetic cores arranged on a surface of a plate, coils provided around the magnetic cores, and a magnetic material plate having a plurality of first magnetic members is characterized in that the magnetic material plate is attached to a surface on the opposite side to a surface where the magnetic cores and the plate come in contact, a gap is provided between each of the first magnetic members adjacent to each other, and the area of a surface where the first magnetic members come in contact with the magnetic cores is larger than the area of a surface where the magnetic cores come in contact with the first magnetic members.

10 Claims, 15 Drawing Sheets

F I G. 3
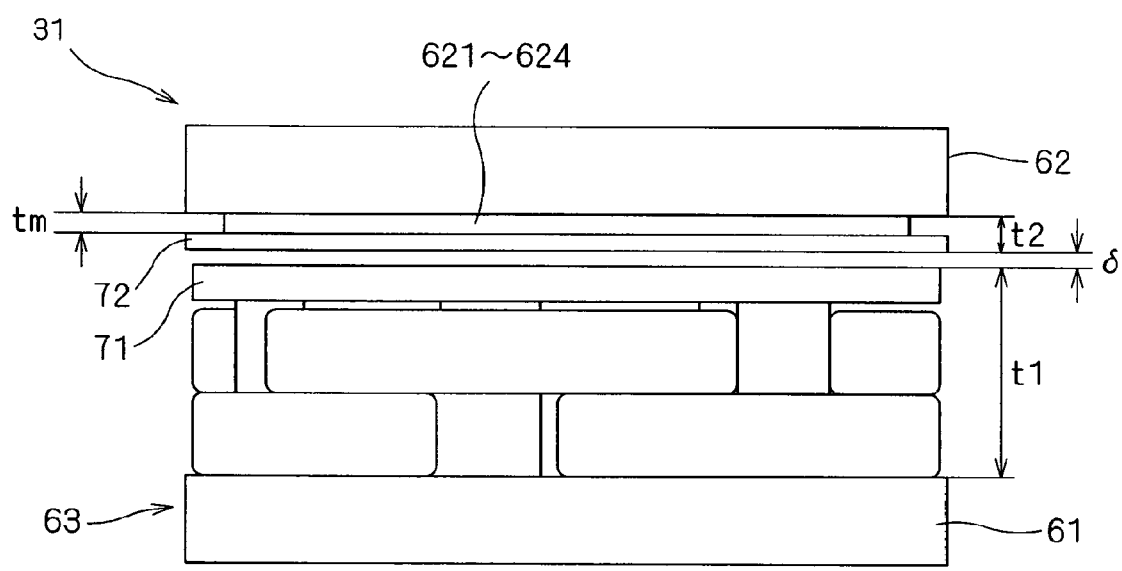

F I G. 1 2
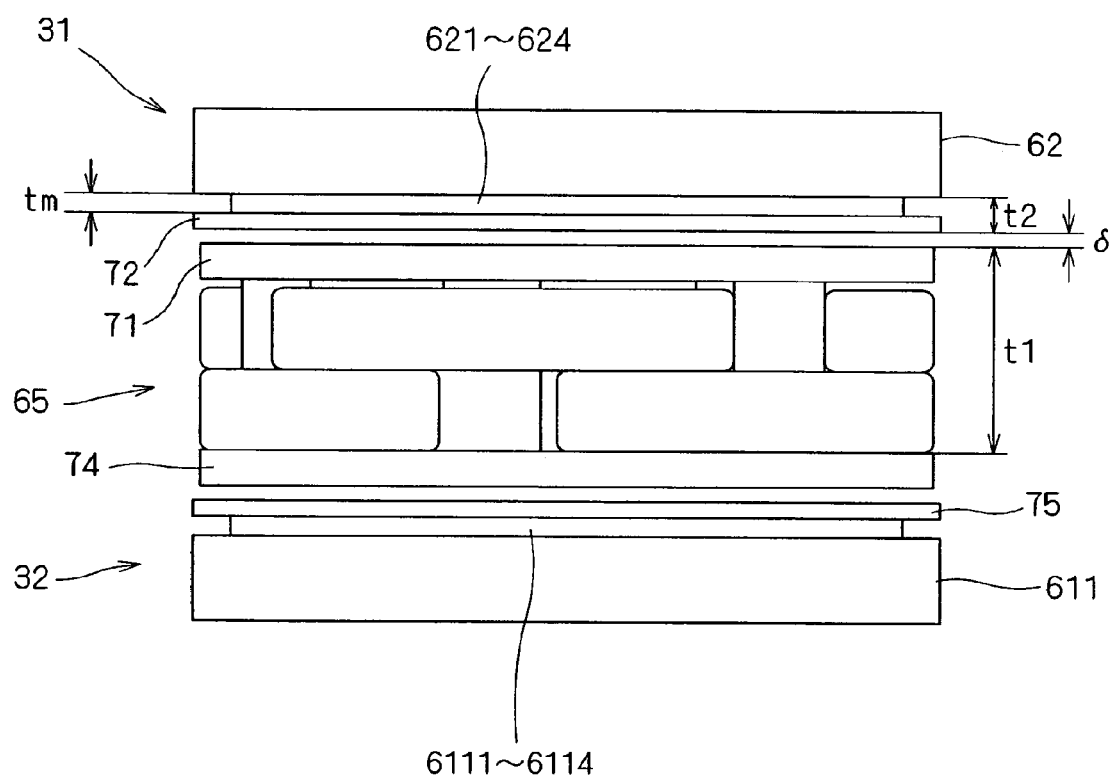

F I G . 1 7
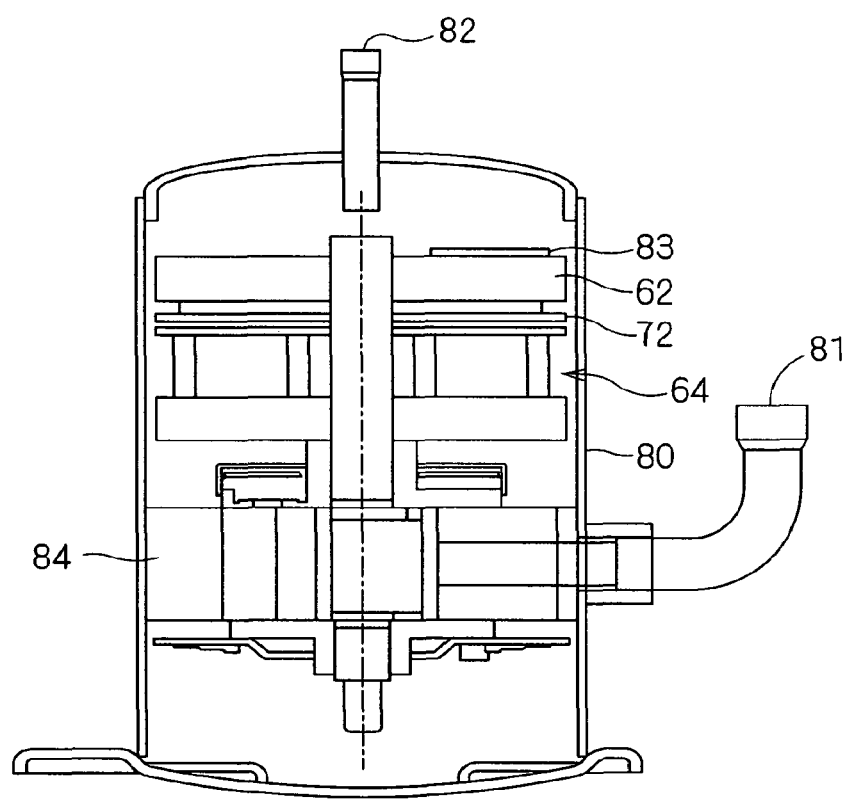

US 7,777,391 B2

ARMATURE, MOTOR AND COMPRESSOR AND METHODS OF MANUFACTURING THE SAME

CROSS-REFERENCE TO RELATED APPLICATIONS

This U.S. National stage application claims priority under 35 U.S.C. §119(a) to Japanese Patent Application Nos. 2005-010397, filed in Japan on Jan. 18, 2005, and 2005-320655, filed in Japan on Nov. 4, 2005, the entire contents of which are hereby incorporated herein by reference.

TECHNICAL FIELD

The present invention relates to armatures, motors and compressors and methods of manufacturing the same, and particularly to a technique of covering a magnetic core with a magnetic member.

BACKGROUND ART

Axial gap type motors include a stator generating magnetic flux along a rotation axis, and a rotor rotatable about the rotation axis.

A stator includes coils wound around a rotation axis, and generates magnetic flux when a current flows through the coils. A rotor is arranged to face the stator with gaps between them in the direction of the rotation axis. The rotor is provided with magnets facing the stator. The rotor rotates when acted upon by the magnetic flux generated by the stator.

Techniques pertinent to the present invention are indicated below:

Patent document 1: Japanese Patent Application Laid-Open No. 10-164779

Patent document 2: Japanese Patent Application Laid-Open No. 10-210720

SUMMARY OF THE INVENTION

Problems to be Solved by the Invention

An embodiment is disclosed by the above patent documents 1 and 2, for example, in which a magnetic core wound with coils on a stator has an end face on a rotor side whose area is larger than the cross-sectional area in a position wound with the coils. According to this embodiment, most of magnetic flux generated by the rotor is introduced to the magnetic core, and by this most of the magnetic flux is interlinked to the coils to increase drive efficiency of the motor.

In either of the above patent document 1 and patent document 2, however, it is difficult to wind the coils around the magnetic cores. It is also difficult to fit coils wound in advance onto the magnetic cores.

The present invention has been made in light of the above circumstances, and has an object to arrange coils easily around magnetic cores.

Means to Solve the Problems

In a first aspect of a method of manufacturing an armature of this invention, the method includes the steps of: (a) arranging, with respect to a core (631; 641) having at least one magnetic core (111 to 114, 121 to 124, 131 to 134; 31 to 36) arranged on a surface (61a; 61a) of a plate (61; 61) to project toward one direction side, coils (A11 to A13, B11 to B13; A31 to A36) around the magnetic cores along the surface; and (b) covering the magnetic cores with first magnetic members (7111 to 7122; 731 to 736) from the one direction side after the step (a), wherein in each one of the first magnetic members, the area of a surface (7111a to 7122a; 731a to 736a) on the opposite side to one of the magnetic cores on which the one of the first magnetic members is arranged is larger than the area of a surface (111a to 114a, 121a to 124a, 131a to 134a; 31a to 36a) of the one of the magnetic cores on the side of the one of the first magnetic members.

In a second aspect of the method of manufacturing an armature of this invention, in the first aspect of the method of manufacturing an armature, a plurality of the magnetic cores (111 to 114, 121 to 124, 131 to 134; 31 to 36) are arranged on the surface (61a; 61a) in the core (631; 641), each of the magnetic cores is covered with one of the first magnetic members (7111 to 7122; 731 to 736) in the step (b), and each one of the first magnetic members covering one of the magnetic cores has a gap (7111b to 7122b; 731b to 736b) with another one of the first magnetic members.

In a third aspect of the method of manufacturing an armature of this invention, in the second aspect of the method of manufacturing an armature, a plurality of the magnetic cores (111 to 114, 121 to 124, 131 to 134; 31 to 36) are arranged circularly on the surface (61a; 61a) in the core (631; 641), in the step (b), a magnetic material plate (71; 73) having the plurality of first magnetic members arranged circularly covers the magnetic cores such that each of the magnetic cores is covered with one of the first magnetic members (7111 to 7122; 731 to 736), and the outline of each of the gaps (7111b to 7122b; 731b to 736b) between the first magnetic members adjacent to each other extends from an inner circumference side to an outer circumference side of the magnetic material plate.

In a fourth aspect of a method of manufacturing an armature of this invention, the method includes the step of: (a) arranging, with respect to a core including a magnetic material plate (71; 73) having a plurality of first magnetic members (7111 to 7122; 731 to 736) arranged circularly and a plurality of magnetic cores (111 to 114, 121 to 124, 131 to 134; 31 to 36), one of the magnetic cores projecting on a surface of each one of the first magnetic members toward the opposite side to one direction (91), coils (A11 to A13, B11 to B13; A31 to A36) around the magnetic cores along the surface, the one of the first magnetic members having a surface (7111a to 7122a; 731a to 736a) on the opposite side to the one of the magnetic cores, whose area is larger than the area of a cross section (111a to 114a, 121a to 124a, 131a to 134a; 31a to 36a) of the one of the magnetic cores on the side of the one of the first magnetic members, and having a gap (7111b to 7122b; 731b to 736b) with another one of the first magnetic members, wherein the outline of each of the gaps between the first magnetic members adjacent to each other in a circular direction extends from an inner circumference side to an outer circumference side of the magnetic material plate.

In a fifth aspect of the method of manufacturing an armature of this invention, the method of manufacturing an armature according to the fourth aspect further includes the step of: (b) covering the magnetic cores with a plate (61; 611) from the opposite side to the one direction (91) after the step (a).

In a sixth aspect of the method of manufacturing an armature of this invention, in the fifth aspect of the method of manufacturing an armature, the plate is a second magnetic material plate (74) having a plurality of second magnetic members (7411 to 7422) arranged circularly, each one of the second magnetic members has a gap (7411b to 7422b) with another one of the second magnetic members, and the outline of the gap between the second magnetic members adjacent to each other in a circular direction extends from an inner circumference side to an outer circumference side of the second magnetic material plate, the second magnetic members covering each of the magnetic cores (111 to 114, 121 to 124, 131 to 134) in the step (b), the one of the second magnetic members having a surface (7411a to 7422a) on the opposite side to one of the magnetic cores on which the one of the second magnetic members is arranged, whose area is larger than the area of a surface (111b to 114b, 121b to 124b, 131b to 134b) of the one of the magnetic cores on the side of the one of the second magnetic members.

In a seventh aspect of the method of manufacturing an armature of this invention, in the sixth aspect of the method of manufacturing an armature, each of the outlines of the second magnetic material plate (74) extends in a direction inclined relative to the radial direction seen from the center of the second magnetic material plate.

In a first aspect of a method of manufacturing a motor of this invention, the method includes: the method of manufacturing an armature according to the sixth or seventh aspect; and the step of arranging magnets (6111 to 6114) to face the second magnetic members from the opposite side to the magnetic cores, the magnets being rotatable about a rotation axis (92) along the one direction (91) and having a plurality of magnetic poles facing the second magnetic members (7411 to 7422).

In a second aspect of the method of manufacturing a motor of this invention, the method of manufacturing a motor according to the first aspect further includes the step of: covering each one of the magnetic poles with one of third magnetic members (751 to 754) to face the second magnetic members (7411 to 7422) from the side of the second magnetic members, each one of the third magnetic members having a gap (751b to 754b) with another one of the third magnetic members.

In an eighth aspect of the method of manufacturing an armature of this invention, the method of manufacturing an armature according to the fourth aspect further includes the step of: (b) arranging a plate (611) on the opposite side to the one direction (91) of the magnetic cores (111 to 114, 121 to 124, 131 to 134; 31 to 36) to be rotatable about a rotation axis (92) along the one direction.

In a ninth aspect of the method of manufacturing an armature of this invention, in the method of manufacturing an armature according to one of the first to third, fifth and eighth aspects, the plate (61; 611) is made out of a magnetic material.

In a tenth aspect of the method of manufacturing an armature of this invention, in the method of manufacturing an armature according to one of the third to seventh, eighth and ninth aspects, each of the outlines of the magnetic material plate (71; 73) extends in a direction inclined relative to the radial direction seen from the center of the magnetic material plate.

In a third aspect of the method of manufacturing a motor of this invention, in the method of manufacturing a motor according to the first or second aspect, each of the outlines of the magnetic material plate (71; 73) extends in a direction inclined relative to the radial direction seen from the center of the magnetic material plate.

In a fourth aspect of the method of manufacturing a motor of this invention, in the method of manufacturing an armature according to one of the second to seventh, eighth and tenth aspects, or in the method of manufacturing a motor according to one of the first to third aspects, the method includes the step of arranging magnets (621 to 624; 621 to 624) to face the first magnetic members from the opposite side to the magnetic cores, the magnets being rotatable about a rotation axis (92; 92) along the one direction (91) and having a plurality of magnetic poles facing the first magnetic members (7111 to 7122; 731 to 736).

In a fifth aspect of the method of manufacturing a motor of this invention, the method of manufacturing a motor according to the fourth aspect further includes the step of: covering each one of the magnetic poles with one of fourth magnetic members (721 to 724; 721 to 724) to face the first magnetic members (7111 to 7122; 731 to 736) from the side of the first magnetic members, each one of the fourth magnetic members having a gap (721b to 724b; 721b to 724b) with another one of the fourth magnetic members.

A method of manufacturing a compressor according to this invention is characterized in that the motor manufactured by the method of manufacturing a motor according to one of the first to sixth aspects is mounted.

In a first aspect of an armature according to this invention, the armature includes: a magnetic material plate (71; 73) having a plurality of first magnetic members (7111 to 7122; 731 to 736) arranged circularly; a plurality of magnetic cores (111 to 114, 121 to 124, 131 to 134; 31 to 36); and coils (A11 to A13, B11 to B13; A31 to A36), wherein in each one of the first magnetic members, one of the magnetic cores projecting toward the opposite side to one direction (91) on a surface of the one of the first magnetic members, which has a surface (7111a to 7122a; 731a to 736a) on the opposite side to one of the magnetic cores on which the one of the second magnetic members is arranged, whose area is larger than the area of a cross section (111a to 114a, 121a to 124a, 131a to 134a; 31a to 36a) of the one of the magnetic cores on the side of the one of the first magnetic members, and has a gap (7111b to 7122b; 731b to 736b) with another one of the first magnetic members, the outline of each of the gaps between the first magnetic members adjacent to each other in a circular direction extends from an inner circumference side to an outer circumference side of the magnetic material plate, and the coils are arranged around the magnetic cores along the surface.

In a second aspect of the armature according to this invention, the armature according to the first aspect further includes a plate (61; 611) arranged to cover the magnetic cores from the opposite side to the one direction (91).

In a third aspect of the armature according to this invention, in the armature according to the second aspect, the plate is a second magnetic material plate (74) having a plurality of second magnetic members (7411 to 7422) arranged circularly, each one of the second magnetic members has a gap (7411b to 7422b) with another one of the second magnetic members, the outline of the gap between the second magnetic members adjacent to each other in a circular direction extends from an inner circumference side to an outer circumference side of the second magnetic material plate, the second magnetic material plate is arranged such that each of the magnetic cores (111 to 114, 121 to 124, 131 to 134) is covered with the second magnetic members, and the area of a surface (7411a to 7422a) on the opposite side to one of the magnetic cores covered by the one of the second magnetic members is larger than the area of a surface (111b to 114b, 121b to 124b, 131b to 134b) of the one of the magnetic cores on the side of the one of the second magnetic members.

In a fourth aspect of the armature according to this invention, in the armature according to the third aspect, each of the outlines extends in a direction inclined relative to the radial direction seen from the center of the second magnetic material plate (74).

In a first aspect of a motor according to this invention, a motor includes: the armature according to the third or fourth aspect; and magnets (6111 to 6114) rotatable about a rotation axis (92; 92) along the one direction (91), the magnets being arranged to face the second magnetic members from the opposite side to the magnetic cores, and having a plurality of magnetic poles facing the second magnetic members.

In a second aspect of the motor according to this invention, the motor according to the first aspect includes a plurality of third magnetic members (751 to 754), wherein each one of the magnetic poles is covered with one of the third magnetic members (751 to 754) to face the second magnetic members (7411 to 7422) from the side of the second magnetic members, and each one of the third magnetic members has a gap (751*b* to 754*b*) with another one of the third magnetic members.

In a fifth aspect of the armature according to this invention, the armature according to the first aspect further includes a plate (611) arranged to be rotatable about a rotation axis (92) along the one direction (91) on the opposite side to the one direction of the magnetic cores (111 to 114, 121 to 124, 131 to 134; 31 to 36).

In a sixth aspect of the armature according to this invention, in the armature according to the second or fifth aspect, the plate (611) is made out of a magnetic material. In a seventh aspect of the armature according to this invention, the armature includes: a plurality of magnetic cores (111 to 114, 121 to 124, 131 to 134; 31 to 36) placed circularly on a surface (61*a*; 61*a*) of a plate (61; 61) to project toward one direction side; a magnetic material plate (71; 73) having a plurality of first magnetic members (7111 to 7122; 731 to 736) arranged circularly; and coils (A11 to A13, B11 to B13; A31 to A36), wherein the coils are arranged around the magnetic cores along the surface, the magnetic material plate covers the magnetic cores from the one direction side such that each of the magnetic cores is covered with one of the first magnetic members, each one of the first magnetic members has a surface (7111*a* to 7122*a*; 731*a* to 736*a*) on the opposite side to one of the magnetic cores on which the one of the first magnetic members is arranged, whose area is larger than the area of a surface (111*a* to 114*a*, 121*a* to 124*a*, 131*a* to 134*a*; 31*a* to 36*a*) of the one of the magnetic cores on the side of the one of the first magnetic members, the one of the first magnetic members having a gap (7111*b* to 7122*b*; 731*b* to 736*b*) with another one of the first magnetic members, and the outline of each of the gaps between the first magnetic members adjacent to each other extends from an inner circumference side to an outer circumference side of the magnetic material plate.

In an eighth aspect of the armature according to this invention, in the armature according to the seventh aspect, each of the outlines extends in a direction inclined relative to the radial direction seen from the center of the second magnetic material plate (71; 73).

In a third aspect of the motor according to this invention, the motor includes: the armature according to one of the first to eighth aspects or the motor according to the first or second aspect; and magnets (621 to 624; 621 to 624) rotatable about a rotation axis (92; 92) along the one direction (91), the magnets facing the first magnetic members (7111 to 7122; 731 to 736) from the opposite side to the magnetic cores, and having a plurality of magnetic poles facing the first magnetic members.

In a fourth aspect of the motor according to this invention, the motor according to the third aspect further includes a plurality of fourth magnetic members (721 to 724; 721 to 724), wherein each one of the magnetic poles is covered with one of the fourth magnetic members to face the first magnetic members (7111 to 7122; 731 to 736) from the side of the first magnetic members, and each one of the fourth magnetic members has a gap (721*b* to 724*b*; 721*b* to 724*b*) with another one of the fourth magnetic members.

In a fifth aspect of the motor according to this invention, the motor includes: a stator (63; 64) comprising a plurality of magnetic cores (111 to 114, 121 to 124, 131 to 134; 31 to 36) placed on a surface (61*a*; 61*a*) of a plate (61; 61) to project toward one direction side, coils (A11 to A13, B11 to B13; A31 to A36), and a plurality of first magnetic members (7111 to 7122; 731 to 736); and a rotor comprising magnets (621 to 624) rotatable about a rotation axis (92; 92) along a direction (91) in which the magnetic cores project, and a plurality of second magnetic members (721 to 724), wherein the coils are arranged around the magnetic cores along the surface, each of the magnetic cores is covered with the first magnetic members from the one direction side, each one of the first magnetic members has a surface (7111*a* to 7122*a*; 731*a* to 736*a*) on the opposite side to one of the magnetic cores on which the one of the first magnetic members is arranged, whose area is larger than the area of a surface (111*a* to 114*a*, 121*a* to 124*a*, 131*a* to 134*a*; 31*a* to 36*a*) of the one of the magnetic cores on the side of the one of the first magnetic members, the one of the first magnetic members having a gap (7111*b* to 7122*b*; 731*b* to 736*b*) with another one of the first magnetic members, the magnets face the first magnetic members from the opposite side to the magnetic cores, and have a plurality of magnetic poles facing the first magnetic members, and each one of the second magnetic members covers one of the magnetic poles to face the first magnetic members from the side of the first magnetic members, and has a gap (721*b* to 724*b*) with another one of the second magnetic members.

In a sixth aspect of the motor according to this invention, in the motor according to the fifth aspect, the stator (63; 64) includes a first magnetic material plate (71; 73) having the plurality of first magnetic members (7111 to 7122; 731 to 736) arranged circularly, and the outline of each of the gaps (7111*b* to 7122*b*; 731*b* to 736*b*) between the first magnetic members adjacent to each other extends from an inner circumference side to an outer circumference side of the first magnetic material plate.

In a seventh aspect of the motor according to this invention, in the motor according to the sixth aspect, each of the outlines extends in a direction inclined relative to the radial direction seen from the center of the first magnetic material plate (71; 73) in the stator (63; 64).

In an eighth aspect of the motor according to this invention, the motor according to the sixth or seventh aspect further includes a second magnetic material plate (72) having the plurality of second magnetic members (721 to 724) arranged circularly, wherein the outline of each of the gaps (721*b* to 724*b*) between the second magnetic members adjacent to each other extends from an inner circumference side to an outer circumference side of the second magnetic material plate.

In a ninth aspect of the motor according to this invention, in the motor according to the eighth aspect, each of the outlines extends in a direction inclined relative to the radial direction seen from the center of the second magnetic material plate (72) in the rotor.

In a tenth aspect of the motor according to this invention, in the motor according to the eighth or ninth aspect, an absolute value ($|R_{so}-R_{ro}|$; $|R_{so}-R_{ro}|$) of a difference between an outside diameter ($R_{so}$; $R_{so}$) of the first magnetic material plate (71; 73) and an outside diameter ($R_{ro}$; $R_{ro}$) of the second magnetic material plate (72) is smaller than a distance (t1; t1) from a surface of the first magnetic material plate on the side of the second magnetic members to the surface.

In an eleventh aspect of the motor according to this invention, in the motor according to the eighth or ninth aspect, an absolute value ($|R_{so}-R_{ro}|$; $|R_{so}-R_{ro}|$) of a difference between an outside diameter ($R_{so}$; $R_{so}$) of the first magnetic material plate (71; 73) and an outside diameter ($R_{ro}$; $R_{ro}$) of the second magnetic material plate (72) is smaller than a distance (t2; t2) from a surface of the second magnetic material plate on the side of the first magnetic members to a surface of the magnets on the opposite side to the second magnetic members.

In a twelfth aspect of the motor according to this invention, in the motor according to one of the eighth to eleventh aspects, an absolute value ($|R_{si}-R_{ri}|$; $|R_{si}-R_{ri}|$) of a difference between an inside diameter ($R_{si}$; $R_{si}$) of the first magnetic material plate (71; 73) and an inside diameter ($R_{ri}$; $R_{ri}$) of the second magnetic material plate (72; 72) is smaller than a distance (t1; t1) from a surface of the first magnetic material plate on the side of the second magnetic members to the surface.

In a thirteenth aspect of the motor according to this invention, in the motor according to one of the eighth to eleventh aspects, an absolute value ($|R_{si}-R_{ri}|$; $|R_{si}-R_{ri}|$) of a difference between an inside diameter ($R_{si}$; $R_{si}$) of the first magnetic material plate (71; 73) and an inside diameter ($R_{ri}$; $R_{ri}$) of the second magnetic material plate (72; 72) is smaller than a distance (t2; t2) from a surface of the second magnetic material plate on the side of the first magnetic members to a surface of the magnets on the opposite side to the second magnetic members.

In a fourteenth aspect of the motor according to this invention, in the motor according to one of the fifth to thirteenth aspects, a width (tss1; tss1) of the gaps (7111b to 7122b; 731b to 736b) between the first magnetic members (7111 to 7122; 731 to 736) adjacent to each other is larger than twice a distance (δ; δ) between surfaces of the first magnetic members and the second magnetic members, the surfaces being closer ones to each other.

In a fifteenth aspect of the motor according to this invention, in the motor according to one of the fifth to fourteenth aspects, a width (trs1) of the gaps (721b to 724b) between the second magnetic members (721 to 724) adjacent to each other is larger than twice a distance (δ) between surfaces of the first magnetic members and the second magnetic members, the surfaces being closer ones to each other.

In a sixteenth aspect of the motor according to this invention, in the motor according to one of the fifth to fifteenth aspects, a thickness (tm; tm) of the magnets (621 to 624; 621 to 624) in the direction is larger than twice a distance (δ; δ) between surfaces of the first magnetic members (7111 to 7122; 731 to 736) and the second magnetic members (721 to 724; 721 to 724), the surfaces being closer ones to each other.

A compressor according to this invention has the motor according to one of the first to sixteenth aspect mounted thereon.

EFFECTS OF THE INVENTION

According to the first aspect of the method of manufacturing an armature of this invention, the coils are arranged around the magnetic cores before covering the magnetic cores with the first magnetic members. Thus the coils are arranged easily. In addition, the areas of surfaces of the first magnetic members on the opposite side to the magnetic cores are larger than the areas of surfaces of the magnetic cores on the side of the first magnetic members. This allows most of magnetic flux to be introduced to the magnetic cores.

According to the second aspect of the method of manufacturing an armature of this invention, magnetic resistance increases in the gaps. This reduces the flow of magnetic flux from one of the first magnetic members to another of the first magnetic members by a short circuit.

According to the third aspect of the method of manufacturing an armature or the seventh aspect of the armature of this invention, a magnetic material plate molded in one piece and the like can be employed, and it is only required to cover the magnetic cores with the magnetic material plate, thus simplifying the manufacturing steps and the structure of the armature.

According to the fourth aspect of the method of manufacturing an armature of this invention, when arranging a plate on the opposite side to the one direction of the core, the coils are arranged around the magnetic cores before arranging the plate. Thus the coils are arranged easily. In addition, the areas of surfaces of the first magnetic members on the opposite side to the magnetic cores are larger than the areas of cross sections of the magnetic cores on the side of the first magnetic members. This allows most of magnetic flux to be introduced to the magnetic cores. Further, magnetic resistance increases in the gaps. This reduces the flow of magnetic flux from one of the first magnetic members to another of the first magnetic members by a short circuit.

According to the fifth aspect of the method of manufacturing an armature or the second aspect of the armature of this invention, the coils are prevented from falling off the magnetic cores.

According to the six aspect of the method of manufacturing an armature or the third aspect of the armature of this invention, the areas of surfaces of the second magnetic members on the opposite side to the magnetic cores are larger than the areas of surfaces of the magnetic cores on the side of the second magnetic members. This allows most of magnetic flux to be introduced to the magnetic cores. Further, magnetic resistance increases in the gaps. This reduces the flow of magnetic flux from one of the second magnetic members to another of the second magnetic members by a short circuit.

According to the seventh aspect of the method of manufacturing an armature or the fourth aspect of the armature of this invention, cogging torque is reduced.

According to the first aspect of the method of manufacturing a motor or the first aspect of the motor of this invention, most of magnetic flux flowing from the rotor is introduced to the magnetic cores via the second magnetic members. This allows the magnetic flux to be interlinked efficiently to the coils.

According to the second aspect of the method of manufacturing a motor or the second aspect of the motor of this invention, magnetic resistance increases in the gaps. This reduces the flow of magnetic flux from one of the third magnetic members to another of the third magnetic members by a short circuit. Additionally, most of the magnetic flux flowing from the magnets is introduced to the magnetic cores via the second magnetic members, and conversely most of the magnetic flux flowing from the armature is introduced to the magnetic cores via the third magnetic members. This increases drive efficiency of the motor.

According to the eighth aspect of the method of manufacturing an armature or the fifth aspect of the armature of this invention, a driven part is driven easily by being connected to the plate.

According to the ninth aspect of the method of manufacturing an armature or the sixth aspect of the armature of this invention, the plate functions as a yoke. This increases drive efficiency or drive output of a motor when the armature manufactured by this manufacturing method is applied to the motor.

According to the tenth aspect of the method of manufacturing an armature, the third aspect of the method of manufacturing a motor or the eighth aspect of the armature of this invention, cogging torque is reduced.

According to the fourth aspect of the method of manufacturing a motor or the third aspect of the motor of this invention, most of magnetic flux flowing from the rotor is introduced to the magnetic cores via the first magnetic members. This allows the magnetic flux to be interlinked efficiently to the coils.

According to the fifth aspect of the method of manufacturing a motor or the third aspect of the motor of this invention, magnetic resistance increases in the gaps. This reduces the flow of magnetic flux from one of the fourth magnetic members to another of the fourth magnetic members by a short circuit. Additionally, most of the magnetic flux flowing from the magnets is introduced to the magnetic cores via the first magnetic members, and conversely most of the magnetic flux flowing from the armature is introduced to the magnetic cores via the fourth magnetic members. This increases drive efficiency of the motor.

According to the method of manufacturing a compressor or the compressor of this invention, a refrigerant and the like can be compressed efficiently.

According to the first aspect of the armature of this invention, the areas of surfaces of the first magnetic members on the opposite side to the magnetic cores are larger than the areas of cross sections of the magnetic cores on the side of the first magnetic members. This allows most of magnetic flux to be introduced to the magnetic cores. In addition, a magnetic material plate molded in one piece and the like can be employed, thus simplifying the manufacturing steps and the structure of the armature.

According to the fifth aspect of the motor of this invention, the first magnetic members cover the magnetic cores, and the areas of the first magnetic members on the opposite side to the magnetic cores are larger than the areas of the magnetic cores on the side of the first magnetic members. Thus the coils do not lie off or fall off at least from the side covered with the first magnetic members. Further, magnetic resistance increases in the gaps. This reduces the flow of magnetic flux from one of the magnetic members to another of the magnetic members by a short circuit both in the stator and rotor. The first magnetic members introduce most of the magnetic flux flowing from the magnets to the magnetic cores, and conversely the second magnetic members introduce most of the magnetic flux flowing from the stator to the magnets. This increases drive efficiency of the motor.

According to the sixth aspect of the motor of this invention, a magnetic material plate molded in one piece and the like can be employed for the first magnetic material plate, thus simplifying the structure of the armature.

According to the seventh or ninth aspect of the motor of this invention, cogging torque is reduced.

According to the eighth aspect of the motor of this invention, a magnetic material plate molded in one piece and the like can be employed for the second magnetic material plate, thus simplifying the structure of the rotor.

According to the tenth aspect of the motor of this invention, the magnetic flux generated by the magnetic cores is prevented from flowing by a short circuit in the stator via the outer circumference side of the first magnetic material plate.

According to the eleventh aspect of the motor of this invention, the magnetic flux generated by the magnets is prevented from flowing by a short circuit in the rotor via the outer circumference side of the second magnetic material plate.

According to the twelfth aspect of the motor of this invention, the magnetic flux generated by the magnetic cores is prevented from flowing by a short circuit in the stator via the inner circumference side of the first magnetic material plate.

According to the thirteenth aspect of the motor of this invention, the magnetic flux generated by the magnets is prevented from flowing by a short circuit in the rotor via the inner circumference side of the second magnetic material plate.

According to the fourteenth aspect of the motor of this invention, the magnetic flux is prevented from being short-circuited from one of the first magnetic members to another via the gaps between the first magnetic members adjacent to each other.

According to the fifteenth aspect of the motor of this invention, the magnetic flux is prevented from being short-circuited from one of the second magnetic members to another via the gaps between the second magnetic members adjacent to each other.

According to the sixteenth aspect of the motor of this invention, the magnetic flux generated by the magnets is prevented from being short-circuited between magnets of the same magnetic pole via the side surfaces thereof.

These and other objects, features, and advantages of the present invention will become more apparent from the following detailed description when taken in conjunction with the accompanying drawings.

BRIEF DESCRIPTION OF DRAWINGS

FIG. 3 is a side view schematically illustrating a motor.

FIG. 12 is a side view schematically illustrating a motor.

FIGS. 17 to 19 are cross-sectional views schematically illustrating a compressor.

DETAILED DESCRIPTION OF THE INVENTION

First Preferred Embodiment

Figure 1:
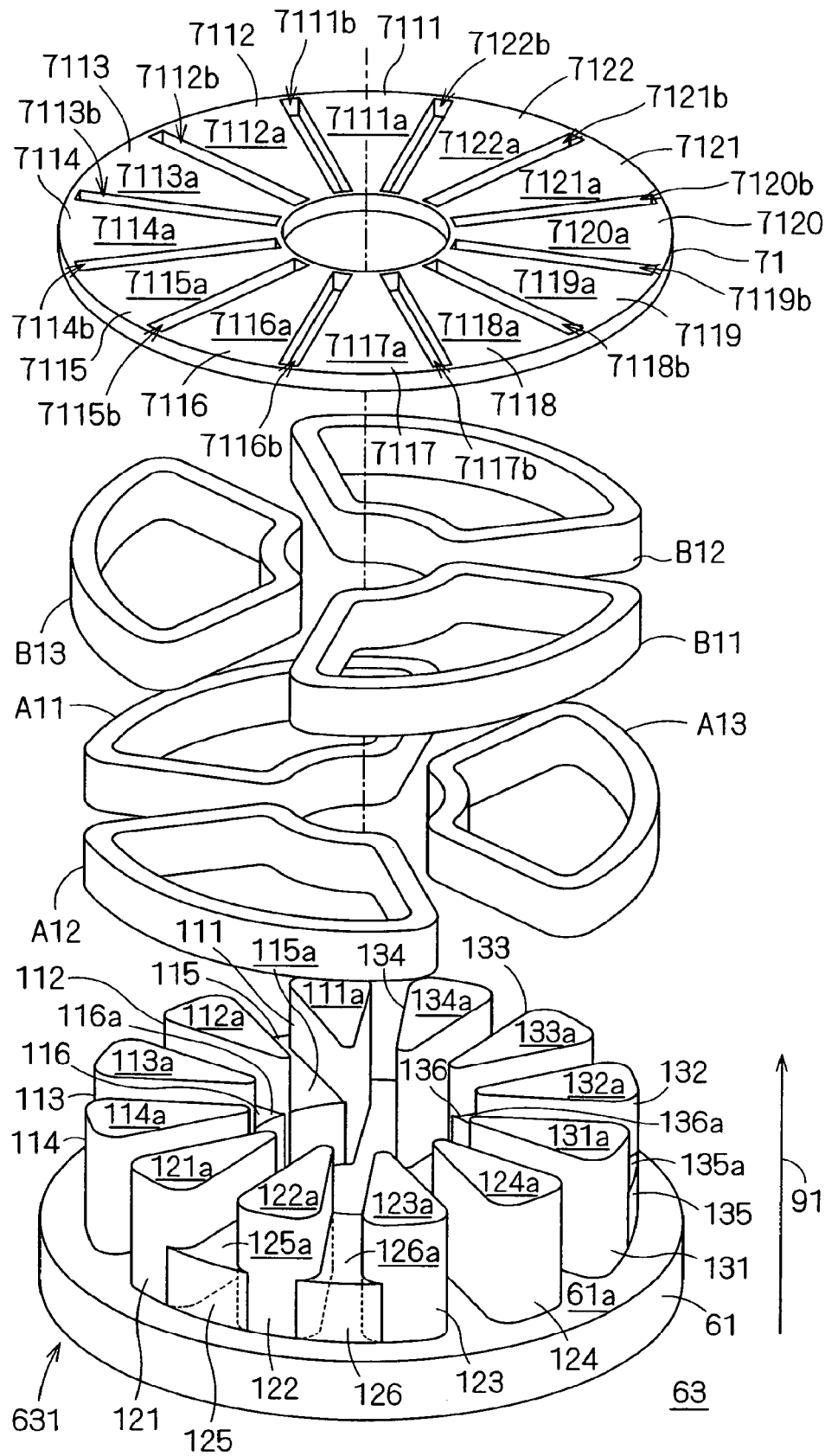
FIG. 1 is a perspective view schematically illustrating a stator 63 described in a first preferred embodiment.

FIG. 1 schematically illustrates a stator 63 according to this embodiment. It is shown as disassembled along a prescribed direction 91. The stator 63 includes a core 631, coils A11 to A13 and B11 to B13, and a magnetic material plate 71.

The core 631 includes a plate 61 and a plurality of magnetic cores 111 to 114, 121 to 124, and 131 to 134. The plate 61 has a surface 61a, and is vertical to the prescribed direction 91. The plurality of magnetic cores 111 to 114, 121 to 124, and 131 to 134 are arranged circularly in this order on the surface 61a, each projecting along the prescribed direction 91.

In FIG. 1, the core 631 further includes step portions 115, 116, 125, 126, 135, and 136. The step portion 115 is positioned between the magnetic core 111 and the magnetic core 112, and the step portion 116 between the magnetic core 112 and the magnetic core 113, respectively. The step portion 125 is positioned between the magnetic core 121 and the magnetic core 122, and the step portion 126 between the magnetic core 122 and the magnetic core 123, respectively. The step portion 135 is positioned between the magnetic core 131 and the magnetic core 132, and the step portion 136 between the magnetic core 132 and the magnetic core 133, respectively.

In each of the step portions 115, 116, 125, 126, 135, and 136, top surfaces 115a, 116a, 125a, 126a, 135a, and 136a on the opposite side to the surface 61a are closer to the plate 61 than top surfaces 111a to 114a, 121a to 124a, and 131a to 134a are of the magnetic cores 111 to 114, 121 to 124, and 131 to 134 on the opposite side to the surface 61a.

It is desirable to arrange the step portions 115, 116, 125, 126, 135, and 136 in the mode described above so that coils described later will be arranged easily to desired positions.

The step portions 115, 116, 125, 126, 135, and 136 may be made out of a magnetic material, or may be made out of a non-magnetic material.

The coils A11 to A13 and B11 to B13 are arranged on the aforementioned core 631 as indicated below.

The coil A11 is arranged to surround the magnetic cores 111 to 113 together, the coil A12 is arranged to surround the magnetic cores 121 to 123 together, and the coil A13 is arranged to surround the magnetic cores 131 to 133 together. The coils A11 to A13 are all arranged along the surface 61a.

The coil B11 is arranged to surround the magnetic cores 123, 124 and 131 together, the coil B12 is arranged to surround the magnetic cores 133, 134 and 111 together, and the coil B13 is arranged to surround the magnetic cores 113, 114 and 121 together.

In arranging the coils A11 to A13, each of the coils A11 to A13 may be wound around the magnetic core in the mode described above, or each of the coils A11 to A13 wound in advance may be fit onto the magnetic core in the mode described above. The latter case is shown in FIG. 1. The same holds for the coils B11 to B13.

This arrangement of the coils A11 to A13 and B11 to B13 is distributed winding. The arrangement with distributed winding is desirable in that magnetic flux generated does not noticeably include a harmonic component.

The coils A11 to A13 and B11 to B13 may be individually surrounded by insulators. This avoids deformation and breakage of the coils A11 to A13 and B11 to B13 resulting from stress applied to the coils A11 to A13 and B11 to B13. Also, insulation is ensured between the coils A11 to A13, B11 to B13 and the magnetic cores 111 to 114, 121 to 124, 131 to 134, as well as between each of the coils.

A round line or a rectangular line may be employed for the coils A11 to A13 and B11 to B13. It is particularly desirable to employ a rectangular line in terms of improving the space factor compared with a round line, thus reducing the size of the stator. A rectangular line is also desirable in terms of reducing the influence of skin effect.

Because a side of the magnetic cores 111 to 114, 121 to 124, and 131 to 134 having the same shape in the axial direction on the opposite side to the plate 61 is open, the coils A11 to A13 and B11 to B13 can be arranged easily on the core 631. It is particularly easy to fit the coils A11 to A13 and B11 to B13 wound in advance in prescribed shape onto the magnetic cores 111 to 114, 121 to 124, and 131 to 134, making it possible to employ a rectangular shape.

Next, the magnetic material plate 71 is arranged in a mode described below on the core 631 on which the coils A11 to A13 and B11 to B13 have been arranged. The magnetic material plate 71 is fixed firmly to the core 631 in this arrangement, for example, with high stability because the core 631 is greater in mass than the magnetic material plate 71.

The magnetic material plate 71 has a plurality of first magnetic members 7111 to 7122 arranged circularly in this order, and each one of the first magnetic members 7111 to 7122 has one of gaps 7111b to 7122b with another one of the first magnetic members. More specifically, the first magnetic material 7111 has the gap 7111b with its adjacent first magnetic material 7112. The first magnetic members 7112 to 7122 have the gaps 7112b to 7122b in the same fashion. In FIG. 1, the outline of each of the gaps 7111b to 7122b extends along the radial direction seen from the center of the magnetic material plate 71.

The magnetic material plate 71 covers the magnetic cores 111 to 114, 121 to 124, and 131 to 134 from the opposite side to the surface 61a. At this time, the first magnetic members 7111 to 7114, 7115 to 7118, and 7119 to 7122 cover the magnetic cores 111 to 114, 121 to 124, and 131 to 134, respectively.

In each one of the first magnetic members 7111 to 7114, 7115 to 7118, and 7119 to 7122, the area of surfaces 7111a to 7114a, 7115a to 7118a, and 7119a to 7122a on the opposite side to one of the magnetic cores 111 to 114, 121 to 124, and 131 to 134 on which the one of the first magnetic members is arranged is larger than the area of the top surfaces 111a to 114a, 121a to 124a, and 131a to 134a of the one of the magnetic cores.

Figure 2:
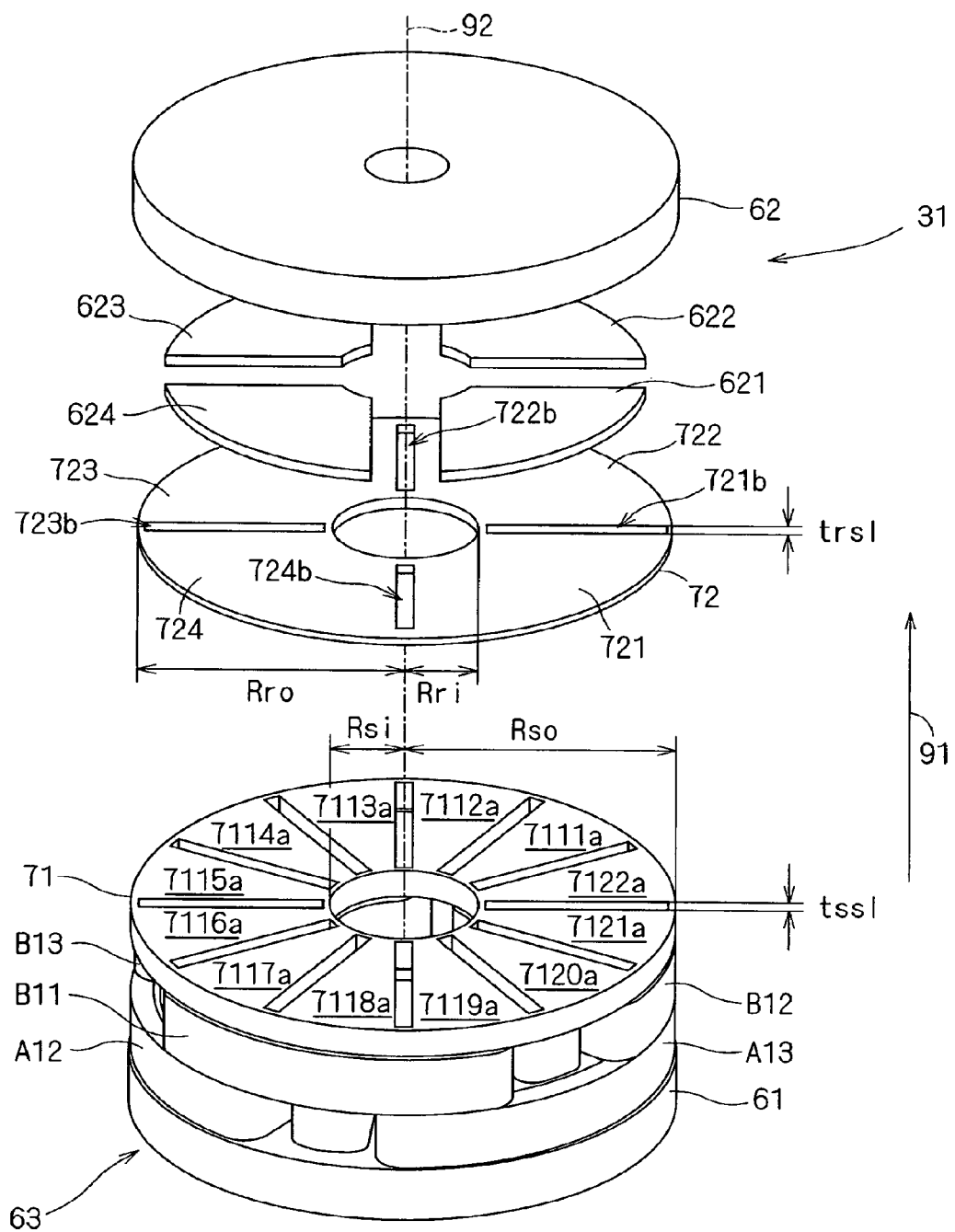
FIG. 2 is a perspective view schematically illustrating a motor described in a second preferred embodiment.

FIG. 2 is a perspective view of the stator 63 manufactured in this manner. FIG. 3 is a side view of the same. FIGS. 2 and 3 also show a rotor, which will be described in a second preferred embodiment.

According to the technique regarding the stator 63 discussed above, the coils A11 to A13 and B11 to B13 are arranged around the magnetic cores 111 to 114, 121 to 124, and 131 to 134 before covering the magnetic cores 111 to 114, 121 to 124, and 131 to 134 with the first magnetic members 7111 to 7114, 7115 to 7118, and 7119 and 7122. Thus the coils A11 to A13 and B11 to B13 can be arranged easily.

In addition, the areas of the surfaces 7111a to 7114a, 7115a to 7118a, and 7119a to 7122a of the first magnetic members 7111 to 7114, 7115 to 7118, and 7119 to 7122 are larger than the areas of the top surfaces 111a to 114a, 121a to 124a, and 131a to 134a of the magnetic cores 111 to 114, 121 to 124, and 131 to 134, respectively. This allows most of magnetic flux to be introduced to the magnetic cores 111 to 114, 121 to 124, and 131 to 134.

Further, magnetic resistance increases in the gaps 7111b to 7122b. This reduces the flow of magnetic flux from one of the first magnetic members 7111 to 7122 to another of the first magnetic members by a short circuit.

Moreover, in the stator 63 manufactured by the technique described above, the magnetic material plate 71, namely, the first magnetic members 7111 to 7114, 7115 to 7118, and 7119 to 7122 cover the magnetic cores 111 to 114, 121 to 124, and 131 to 134, and the areas of the surfaces 7111a to 7114a, 7115a to 7118a, and 7119a to 7122a of the first magnetic members are larger than the areas of the top surfaces 111a to 114a, 121a to 124a, and 131a to 134a of the magnetic cores, respectively. Thus the coils B11 to B13 does not lie off or fall off at least from the side covered with the magnetic material plate 71.

Second Preferred Embodiment

FIGS. 2 and 3 are schematic perspective view and side view of a motor according to this embodiment. This motor includes the stator 63 explained in the first preferred embodiment and a rotor 31.

The rotor 31 includes a substrate 62, magnets 621 to 624, and a magnetic material plate 72. The substrate 62 is rotatable about a rotation axis 92 along the prescribed direction 91, and is arranged to face the magnetic material plate 71 from the opposite side to the plate 61.

The magnets 621 to 624 are arranged on a surface of the substrate 62 on the side of the magnetic material plate 71, to face the magnetic material plate 71. More specifically, the magnets 621 to 624 each have a magnetic pole on the side of the magnetic material plate 71, with the polarities of magnetic poles varying between adjacent magnets. The rotor 31 rotates when magnetic flux generated by the stator 63 acts on the magnets 621 to 624.

The magnetic material plate 72 has a plurality of fourth magnetic members 721 to 724 arranged circularly in this order, and each one of the fourth magnetic members 721 to 724 has one of gaps 721b to 724b with another one of the fourth magnetic members. More specifically, the fourth magnetic material 721 has the gap 721b with its adjacent fourth magnetic material 722. The fourth magnetic members 722 to 724 have the gaps 722b to 724b in the same fashion.

The magnetic material plate 72 covers the magnets 621 to 624 from the opposite side to the substrate 62, to face the magnetic material plate 71 with gaps between them. More specifically, the fourth magnetic members 721 to 724 cover the magnets 621 to 624, respectively.

Because the magnets 621 to 624 exhibit a plurality of magnetic poles facing the first magnetic members 7111 to 7122, it can be understood that, with respect to each one of the magnetic poles, one of the fourth magnetic members 721 to 724 covers the one of the magnetic poles from the side of the first magnetic members 7111 to 7122, to face the first magnetic members 7111 to 7122.

According to the technique regarding the motor discussed above, most of magnetic flux flowing from the rotor 31 is introduced to the magnetic cores 111 to 114, 121 to 124, and 131 to 134 via the magnetic material plate 71, namely, via the first magnetic members 7111 to 7114, 7115 to 7118, and 7119 to 7122. This allows the magnetic flux to be interlinked efficiently to the coils A11 to A13 and B11 to B13.

Further, with the aforementioned magnetic material plate 72 covering the magnets 621 to 624, the flow of magnetic flux by a short circuit is reduced from one of the fourth magnetic members 721 to 724 to another of the fourth magnetic members in the rotor. This is due to an increase in magnetic resistance in the gaps 721b to 724b. Additionally, most of the magnetic flux flowing from the magnets 621 to 624 is introduced to the stator 63 as mentioned above, and also most of the magnetic flux flowing from the stator 63 is introduced to the magnets 621 to 624 via the magnetic material plate 72, namely, via the fourth magnetic members 721 to 724. This increases drive efficiency of the motor.

Instead of covering the magnets 621 to 624 with the magnetic material plate 72, each of the fourth magnetic members 721 to 724 may cover each of the magnets 621 to 624, respectively, for example, or parts of the fourth magnetic members 721 to 724 molded in one piece may cover the magnets 621 to 624, for example.

Nevertheless, it is desirable to employ the magnetic material plate 72 when covering the magnets 621 to 624 with the fourth magnetic members 721 to 724, respectively, in terms of molding the magnetic material plate 72 in one piece, for example, thus simplifying the manufacturing steps and the structure of the motor.

It is desirable that the plate 61 and the substrate 62 be made out of a magnetic material in terms of functioning as yokes to increase drive efficiency or drive output of the motor.

Even when a magnetic material is employed for the substrate 62, iron loss, mainly eddy-current loss and hysteresis loss are reduced for the following reason. Namely, when the coils A11 to A13 and B11 to B13 are arranged with distributed winding, magnetic flux generated by the stator 63 includes only a small amount of harmonic components, so eddy-current loss is small. And when the rotor 31 rotates in synchronization with a rotational magnetic field generated at the stator 63, hysteresis loss based on a fundamental component of that rotational magnetic field is reduced.

The rotor 31 does not have to include the substrate 62, or the substrate 62 and the magnetic material plate 72. In such cases, a disc-shaped magnet magnetized with a plurality of magnetic poles may be employed for example instead of the magnets 621 to 624. In magnetizing this magnet, the magnetic poles are formed to flow magnetic flux only from a surface of this magnet on the side of the stator 63, for example.

Alternatively, the rotor 31 does not have to include the magnets 621 to 624. In such case, the rotor 31 may provided with embosses on a surface thereof on the side of the stator 63, for example, to generate reluctance torque by the magnetic flux flowing from the stator 63.

Nevertheless, it is desirable to arrange the magnets 621 to 624 on the substrate 62 in the rotor 31 in terms of the following respects. Namely, even when a magnetic material is employed for the substrate 62, a magnetic field generated by the magnets 621 to 624 saturates the magnetic flux inside the substrate 62 to reduce a variation in the magnetic flux inside the substrate 62 generated by a harmonic component of the magnetic flux generated by the stator 63, thereby reducing iron loss of the substrate 62. Also, high torque is generated by a permanent magnet, increasing the torque constant and reducing copper loss.

Third Preferred Embodiment

Figure 4:
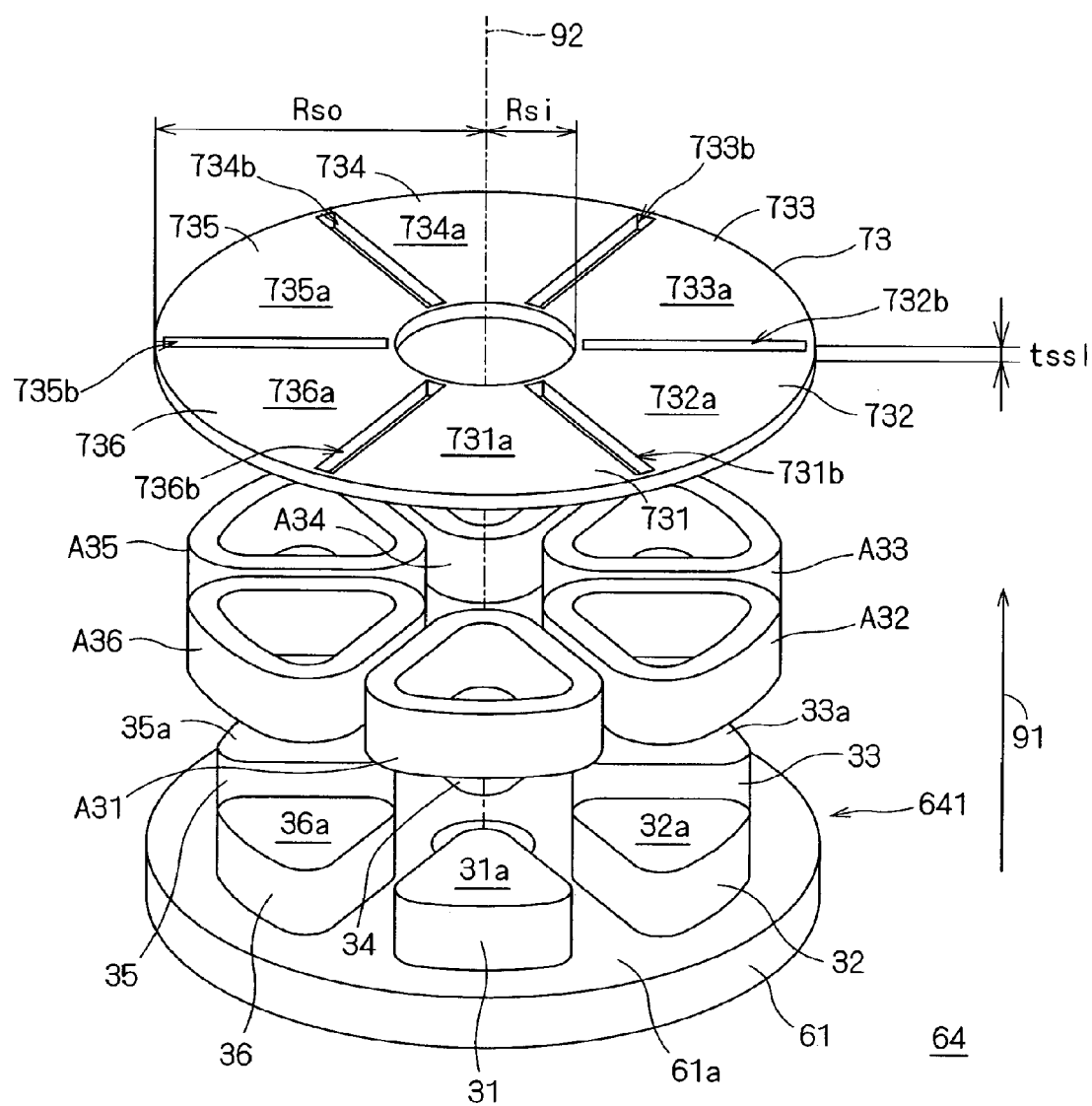
FIG. 4 is a perspective view schematically illustrating the stator 63 described in a third preferred embodiment.

FIG. 4 schematically illustrates a stator 64 according to this embodiment. It is shown as disassembled along the prescribed direction 91. The stator 64 includes a core 641, coils A31 to A36, and a magnetic material plate 73.

The core 641 includes the plate 61 and a plurality of magnetic cores 31 to 36. The plate 61 has the surface 61a, and is vertical to the prescribed direction 91. The plurality of magnetic cores 31 to 36 are arranged circularly in this order on the surface 61a, each projecting along the prescribed direction 91.

The coil A31 is arranged around the magnetic core 31 along the surface 61a. The coils A32 to A36 are arranged around the magnetic cores 32 to 36 in the same fashion.

In arranging the coils A31 to A36, each of the coils A31 to A36 may be wound around the magnetic core in the mode described above, or each of the coils A31 to A36 wound in advance may be fit onto the magnetic core in the mode described above. The latter case is shown in FIG. 4.

As explained in the first preferred embodiment, the coils A31 to A36 may be individually surrounded by insulators. Also, a rectangular line may be employed for the coils A31 to A36.

The magnetic material plate 73 has a plurality of first magnetic members 731 to 736 arranged circularly in this order, and each one of the first magnetic members 731 to 736 has one of gaps 731b to 736b with another one of the first magnetic members. More specifically, the first magnetic material 731 has the gap 731b with its adjacent first magnetic material 732. The first magnetic members 732 to 736 have the gaps 732b to 736b in the same fashion. In FIG. 4, the outline of each of the gaps 731b to 736b extends along the radial direction seen from the center of the magnetic material plate 73.

The magnetic material plate 73 covers the magnetic cores 31 to 36 from the opposite side to the surface 61a. At this time, the first magnetic members 731 to 736 cover the magnetic cores 31 to 36, respectively.

In each one of the first magnetic members 731 to 736, the area of surfaces 731a to 736a on the opposite side to one of the magnetic cores 31 to 36 on which the one of the first magnetic members is arranged is larger than the area of surfaces 31a to 36a (a reference numeral 34 is not indicated in FIG. 4 because a surface 34a is hidden by the coil A31) of the one of the magnetic cores 31 to 36 on the side of the first magnetic members 731 to 736.

Figure 5:
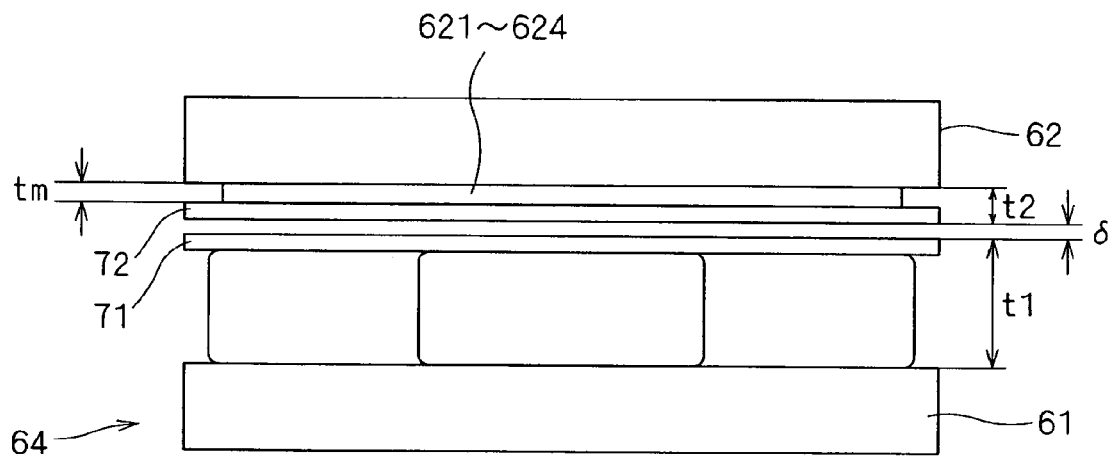
FIG. 5 is a side view schematically illustrating a motor.

FIG. 5 is a side view of the stator 64 manufactured in this manner. FIG. 5 also shows a rotor, which will be described later.

According to the technique regarding the stator 64 discussed above, the same effects can be obtained as those of the stator 63 explained in the first preferred embodiment.

A motor can be formed with the stator 64 in the same fashion as the second preferred embodiment (FIG. 2). More specifically, as illustrated in FIG. 5, a rotor is arranged on the stator 64 from the opposite side to the plate 61, to face the magnetic material plate 73.

According to the technique regarding this motor, the same effects can be obtained as those of the motor explained in the second preferred embodiment.

Figure 6:
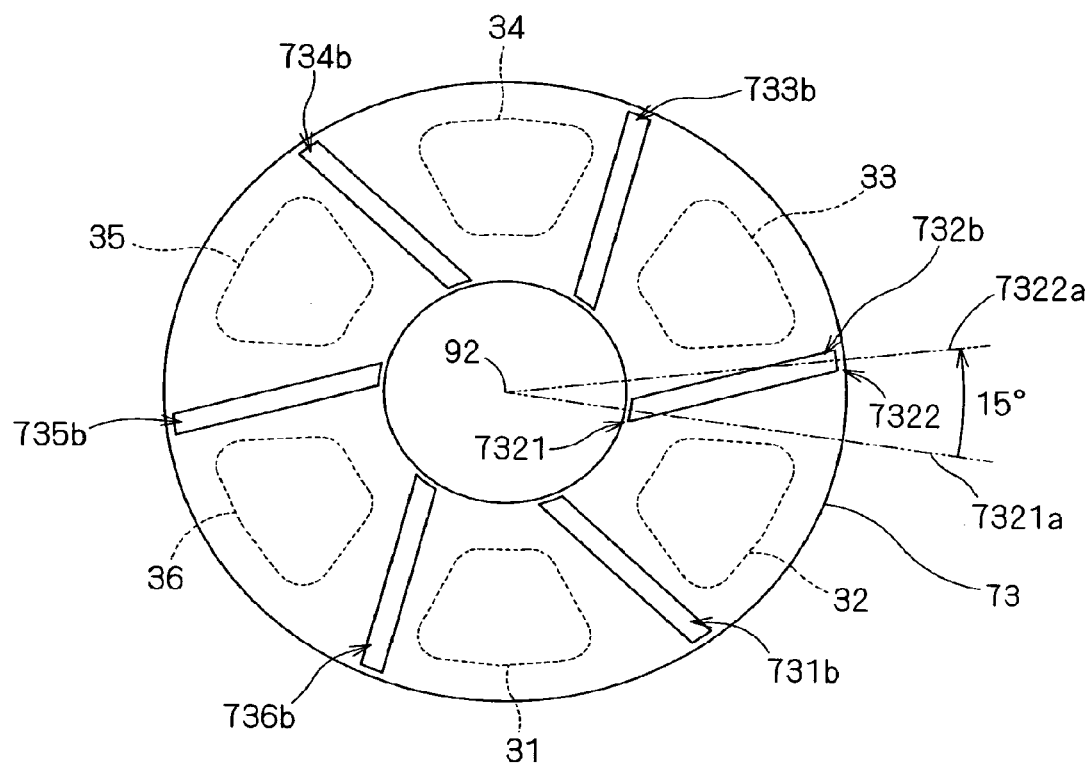
FIG. 6 is a plan view schematically illustrating a magnetic material plate 73.

It is desirable that the outlines of the gaps 731b to 736b of the magnetic material plate 73 be inclined relative to the radial direction seen from the center of the magnetic material plate 73 in terms of reducing cogging torque. FIG. 6 illustrates its specific mode.

FIG. 6 schematically illustrates the magnetic material plate 73 seen from the opposite side to the magnetic cores 31 to 36. FIG. 6 shows a direction 7321a toward one end 7321 of the gap 732b on the inner circumference side of the magnetic material plate 73, and a direction 7322a toward the other end 7322 of the gap 732b, seen from the center of the magnetic material plate 73. The direction 7322a forms an angle of 15° with the direction 7321a in a counterclockwise direction seen from the opposite side to the magnetic cores 31 to 36. The same holds for the gaps 731b, and 733b to 736b.

Cogging torque is reduced in the same fashion in the magnetic material plate 71 explained in the first and second preferred embodiments by inclining the outlines of its gaps 7111b to 7122b.

Figure 7:
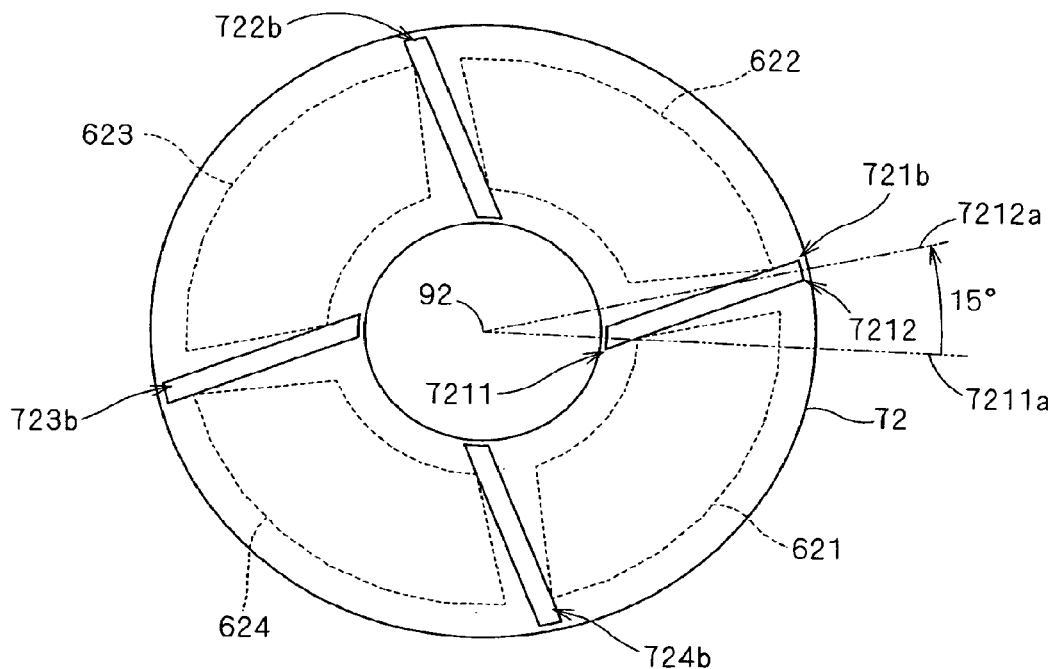
FIGS. 7 and 8 are plan views schematically illustrating a magnetic material plate 72.
Figure 8:
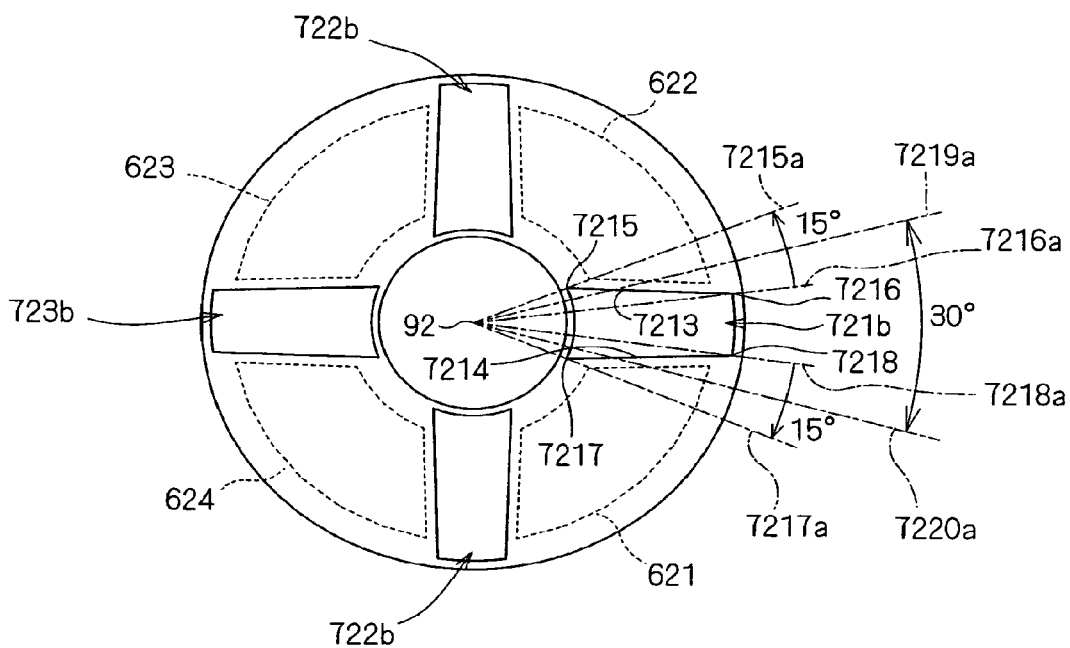

In any of the motors discussed above, it is desirable that the outlines of the gaps 721b to 724b of the magnetic material plate 72 of the rotor be inclined relative to the radial direction seen from the center of the magnetic material plate 72 in terms of reducing cogging torque. FIGS. 7 and 8 illustrate its specific mode.

FIGS. 7 and 8 schematically illustrate the magnetic material plate 72 seen from the opposite side to the magnets 621 to 624. FIG. 7 shows a direction 7211a toward one end 7211 of the gap 721b on the inner circumference side of the magnetic material plate 72, and a direction 7212a toward the other end 7212 of the gap 721b, seen from the center of the magnetic material plate 72. The direction 7212a forms an angle of 15° with the direction 7211a in a counterclockwise direction seen from the opposite side to the magnets 621 to 624. The same holds for the gaps 722b to 724b.

FIG. 8 shows, with respect to one side 7213 of the outline of the gap 721b, a direction 7215a toward one end 7215 on the inner circumference side of the magnetic material plate 72, and a direction 7216a toward the other end 7216, seen from the center of the magnetic material plate 72. In addition, with respect to the other side 7214 of the outline of the gap 721b, a direction 7217a toward one end 7217 on the inner circumference side of the magnetic material plate 72, and a direction 7218a toward the other end 7218, seen from the center of the magnetic material plate 72 are shown. The direction 7215a forms an angle of 15° with the direction 7216a in a counterclockwise direction seen from the opposite side to the magnets 621 to 624, and the direction 7217a forms an angle of 15° with the direction 7218a in a clockwise direction. The same holds for the gaps 722b to 724b.

It is desirable to widen the width of each of the gaps 721b to 724b shown in FIGS. 7 and 8 in terms of focusing the magnetic flux on the center of the magnetic members 721 to 724. The width of the gaps 721b to 724b can be understood as an angle formed by a center line 7219a of the directions 7215a and 7216a, and a center line 7220a of the directions 7217a and 7218a. Namely, as this angle increases, the width of the gaps 721b to 724b increases. This angle is shown as being 30° in FIG. 8.

When the magnetic material plate 73 shown in FIG. 6 is employed for the stator 64 and the magnetic material plate 72 shown in FIG. 7 or 8 is employed for the rotor, the inclination of the outlines of the gaps 721b to 724b relative to the outlines of the gaps 731b to 736b is greater than that when the outlines of the gaps of one of the magnetic material plates 72 and 73 are along the radial direction.

More specifically, when the magnetic material plate 72 shown in FIG. 7 is employed, with the direction 7211a and the direction 7321a being aligned seen from the direction of the rotation axis 92, the direction 7212a and the direction 7322a form an angle of 30° seen from the direction of the rotation axis 92. When the magnetic material plate 72 shown in FIG. 8 is employed, with the direction 7217a and the direction 7321a being aligned seen from the direction of the rotation axis 92, the direction 7218a and the direction 7322a form an angle of 30° seen from the direction of the rotation axis 92.

Thus, cogging torque in the motor is further reduced.

In any of the preferred embodiments thus described, the methods of manufacturing the stators 63 and 64 can be understood as follows. That is, these manufacturing methods include an arrangement step and a covering step. In the arrangement step, on the cores 631 and 641 having at least one of the magnetic cores 111 to 114, 121 to 124, 131 to 134, and 31 to 36 arranged to project toward one direction side on the surface 61a of the plate 61, the coils A11 to A13, B11 to B13, and A31 to A36 are arranged around the magnetic cores 111 to 114, 121 to 124, 131 to 134, and 31 to 36 along the surface 61a. In the covering step, the first magnetic members 7111 to 7122 and 731 to 736 cover the magnetic cores 111 to 114, 121 to 124, 131 to 134, and 31 to 36 from the opposite side to the surface 61a after the arrangement step.

Instead of covering the magnetic cores 111 to 114, 121 to 124, and 131 to 134 with the magnetic material plate 71 in the stator 63, each of the first magnetic members 7111 to 7114, 7115 to 7118, and 7119 to 7122 may cover each of the magnetic cores 111 to 114, 121 to 124, and 131 to 134, respectively, for example, or parts of the first magnetic members 7111 to 7122 molded in one piece may cover the magnetic cores 111 to 114, 121 to 124, and 131 to 134, for example. The same holds for the stator 64. Nevertheless, it is desirable to employ the magnetic material plate 71 when covering the magnetic cores 111 to 114, 121 to 124, and 131 to 134 with the first magnetic members 7111 to 7114, 7115 to 7118, and 7119 to 7122, respectively, in terms of molding the magnetic material plate 71 in one piece, for example, thus simplifying the manufacturing steps and the structure of the stator 63. The same holds for the magnetic material plate 73.

Fourth Preferred Embodiment

Figure 9:
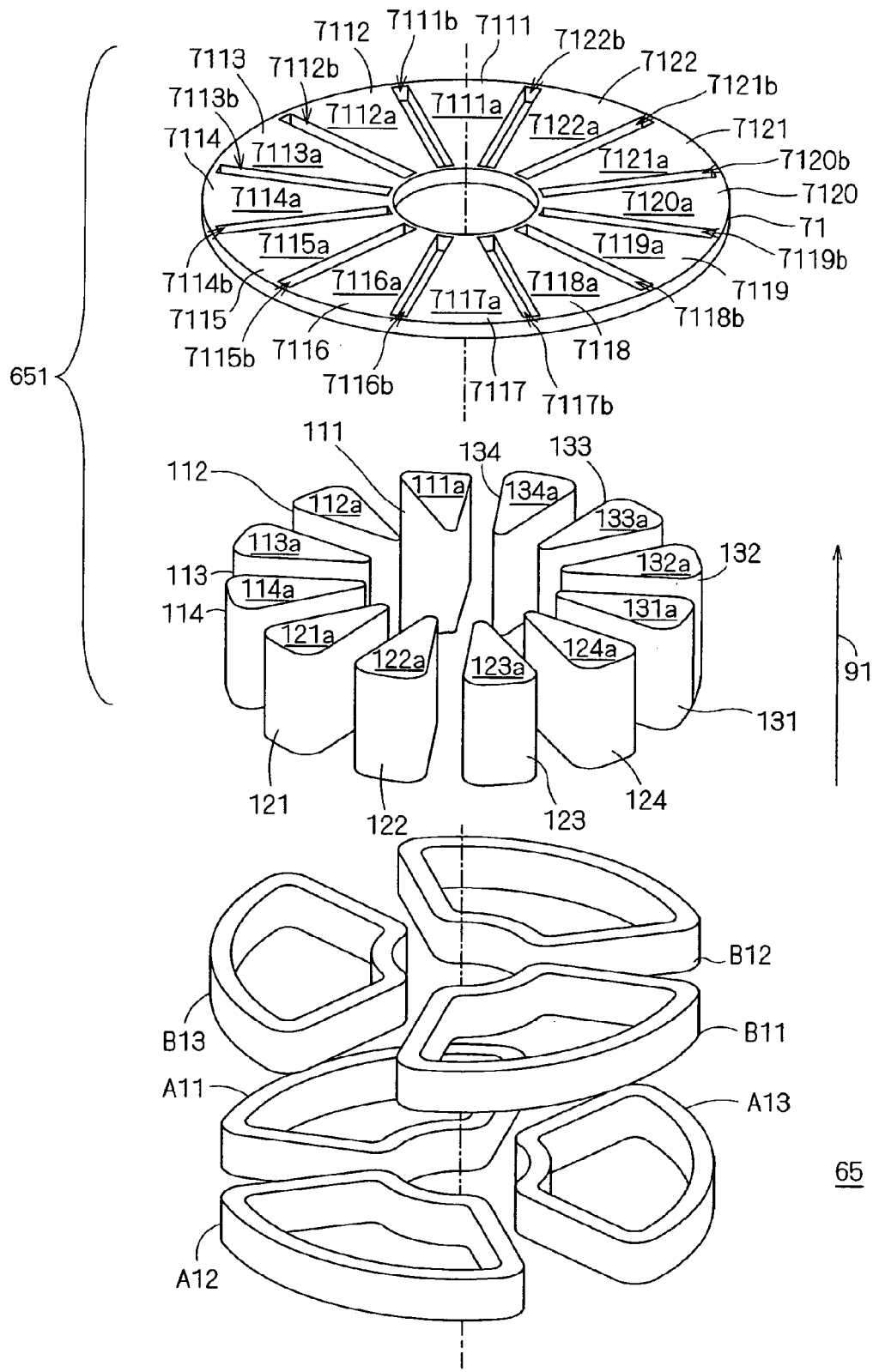
FIG. 9 is a perspective view schematically illustrating a stator 65 described in a fourth preferred embodiment.

FIG. 9 schematically illustrates a stator 65 according to this embodiment. It is shown as disassembled along the prescribed direction 91. The stator 65 includes a core 651, and the coils A11 to A13 and B11 to B13.

The core 651 includes the magnetic material plate 71 and the plurality of magnetic cores 111 to 114, 121 to 124, and 131 to 134. The magnetic material plate 71 has a similar structure to that of the first preferred embodiment, and is vertical to the prescribed direction 91.

The magnetic core 111 projects on a surface of the first magnetic material 7111 toward the opposite side to the prescribed direction 91. The area of the surface 7111*a* of the first magnetic material 7111 on the opposite side to the magnetic core 111 is larger than the area of the cross section 111*a* (the cross section 111*a* is shown in FIG. 9 because the first magnetic material 7111 and the magnetic core 111 are shown as disassembled along the prescribed direction 91) of the magnetic core 111 on the side of the first magnetic material 7111.

The magnetic cores 112 to 114, 121 to 124, and 131 to 134 also project on surfaces of the first magnetic members 7112 to 7114, 7115 to 7118, and 7119 to 7122, respectively, toward the opposite side to the prescribed direction 91. The areas of the surfaces 7112*a* to 7114*a*, 7115*a* to 7118*a*, and 7119*a* to 7122*a* on the opposite side to the magnetic cores 112 to 114, 121 to 124, and 131 to 134, respectively, are larger than the areas of the cross sections 112*a* to 114*a*, 121*a* to 124*a*, and 131*a* to 134*a* of the magnetic cores on the side of the first magnetic members.

The coils B11 to B13 are arranged on the core 651 from the opposite side to the prescribed direction 91, namely, the opposite side to the magnetic material plate 71 with respect to the magnetic cores, and then the coils A11 to A13 are arranged.

More specifically, the coil B11 is arranged to surround the magnetic cores 123, 124 and 131 together, the coil B12 is arranged to surround the magnetic cores 133, 134 and 111 together, and the coil B13 is arranged to surround the magnetic cores 113, 114 and 121 together.

The coil A11 is arranged to surround the magnetic cores 111 to 113 together, the coil A12 is arranged to surround the magnetic cores 121 to 123 together, and the coil A13 is arranged to surround the magnetic cores 131 to 133 together. The coils A11 to A13 and B11 to B13 are all arranged along the surfaces of the first magnetic members 7111 to 7114, 7115 to 7118, and 7119 to 7122.

The coils A11 to A13 and B11 to B13 may be arranged by employing the winding or the fitting of coils wound in advance as described in the first preferred embodiment. The latter case is shown in FIG. 9.

In addition, the coils A11 to A13 and B11 to B13 may be individually surrounded by insulators as in the first preferred embodiment, and a round line or a rectangular line may be employed for each of the coils.

According to the technique regarding the stator 65 discussed above, most of magnetic flux can be introduced to the magnetic cores 111 to 114, 121 to 124, and 131 to 134, and the flow of magnetic flux by a short circuit is prevented from one of the first magnetic members to another of the first magnetic members, as in the aforementioned preferred embodiments. Further, because a side of the magnetic cores 111 to 114, 121 to 124, and 131 to 134 on the opposite side to the magnetic material plate 71 is open, the coils A11 to A13 and B11 to B13 can be arranged easily around the magnetic cores 111 to 114, 121 to 124, and 131 to 134.

Figure 10:
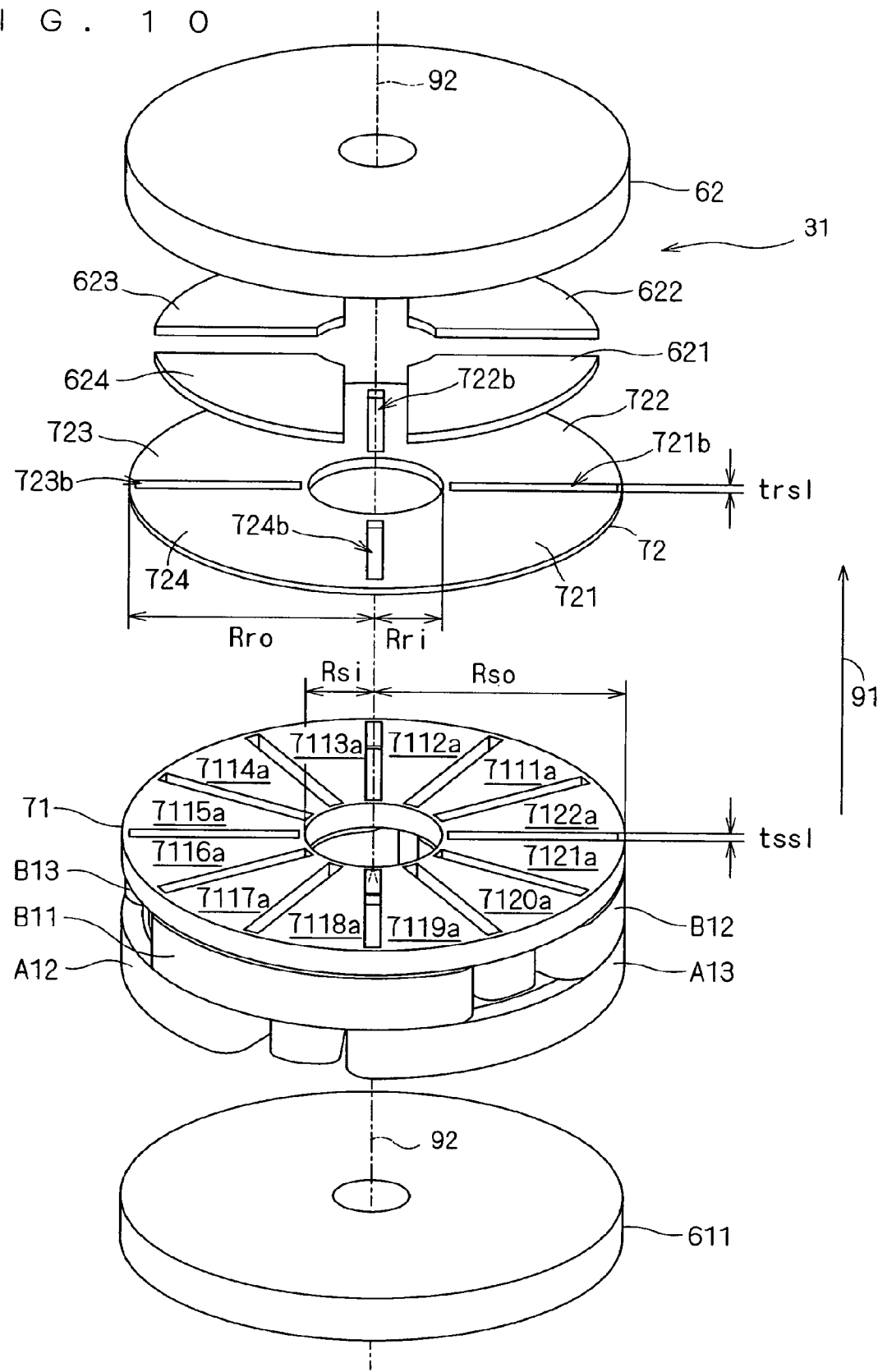
FIG. 10 is a perspective view schematically illustrating a motor.

In FIG. 10, a plate 611 is arranged on the stator 65 from the opposite side to the magnetic material plate 71, and the rotor 31 is also arranged as in the second preferred embodiment.

The plate 611 may cover the stator 65 from the opposite side to the magnetic material plate 71 (first mode), or may be arranged to be rotatable about the rotation axis 92 along the prescribed direction 91 at a position of the stator 65 on the opposite side to the magnetic material plate 71 (second mode).

According to the first mode, the same effects can be obtained as those of the first and second preferred embodiments. The following effects can be further obtained. Note that the structure obtained in the first mode is similar to the stator 63.

When the plate 611 is made out of a magnetic material, electromagnetic steel plates that are laminated would be sufficient for the plate 611 without having to employ a dust core, thus simplifying the manufacture. The reason is that since magnetic flux flows through the plate 611 mainly in a direction vertical to the prescribed direction 91, namely, a direction vertical to the direction in which the electromagnetic steel plates are laminated, the employment of laminated electromagnetic steel plates does not noticeably increase iron loss in the plate 611.

Further, when the magnetic material plate 71 and the magnetic cores 111 to 114, 121 to 124, and 131 to 134 are molded in one piece, the stator 65 is manufactured with improved accuracy, thus improving the accuracy of arranging the rotor to face the magnetic material plate 71.

According to the second mode, a driven part is driven easily by being connected to the plate 611. By way of example, a fan may be employed for the driven part as described later.

Further, according to the second mode, an air gap is provided across both sides of the stator 65 with respect to the prescribed direction 91, thus canceling thrust force acting on the rotor 31. Additionally, as the plate 611 rotates with the same number of rotations as the rotational magnetic field, the magnetic flux does not alternate. Therefore in the plate 61, hysteresis loss will not be generated but only eddy-current loss will be due to a high-order component of the magnetic flux rotation, and iron loss is noticeably reduced as well.

Fifth Preferred Embodiment

Figure 11:
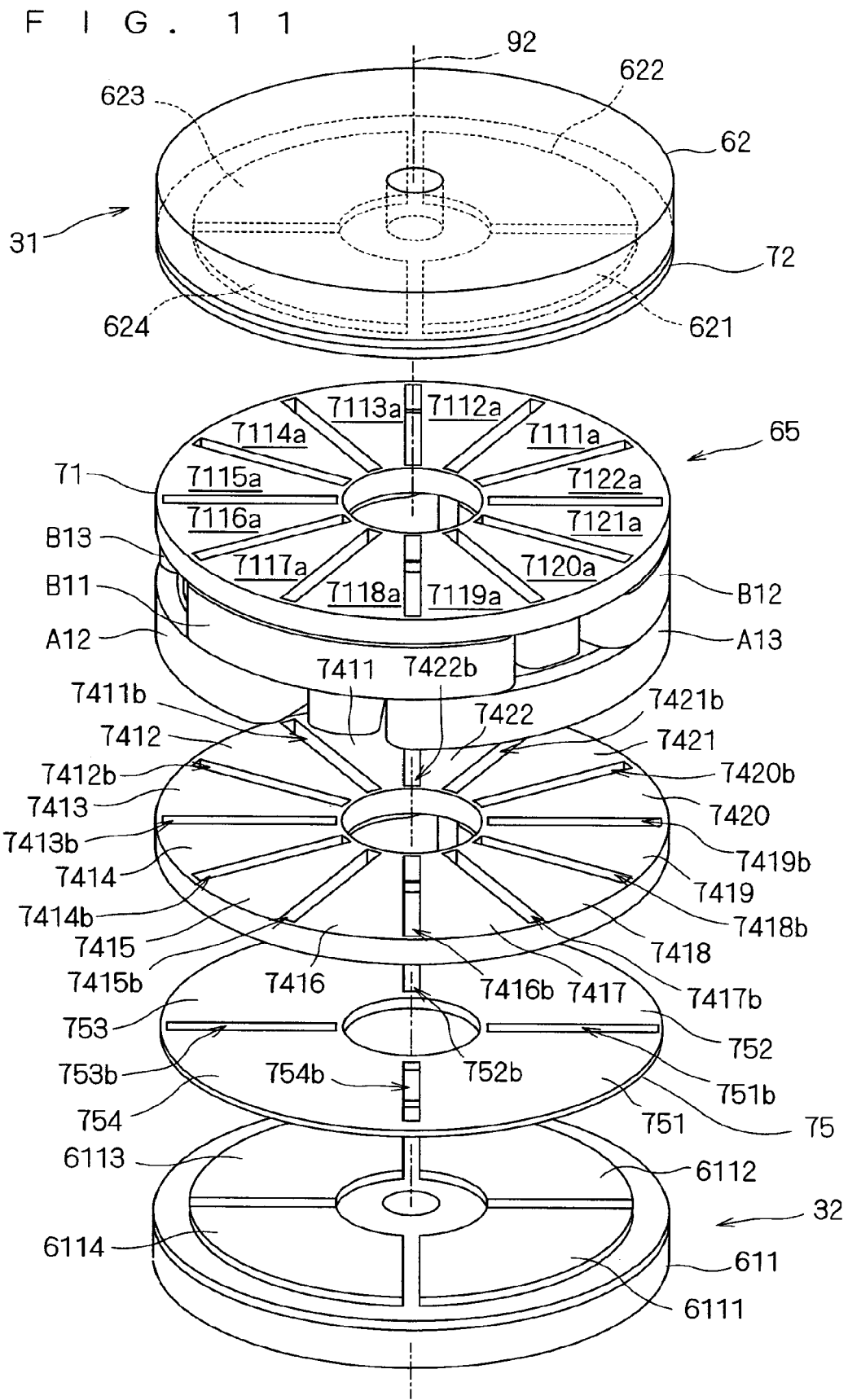
FIG. 11 is a perspective view schematically illustrating a motor described in a fifth preferred embodiment.

In FIG. 11, a magnetic material plate 74 further covers the stator 65 in the second mode explained in the fourth preferred embodiment. This mode can also be understood that the magnetic material plate 74 instead of the plate 611 covers the stator 65 in the first mode explained in the fourth preferred embodiment.

The magnetic material plate 74 has a plurality of second magnetic members 7411 to 7422 arranged circularly in this order, and each one of the second magnetic members 7411 to 7422 has one of gaps 7411*b* to 7422*b* with another one of the second magnetic members. More specifically, the second magnetic material 7411 has the gap 7411*b* with its adjacent second magnetic material 7412. The second magnetic members 7412 to 7422 have the gaps 7412*b* to 7422*b* in the same fashion. In FIG. 11, the outline of each of the gaps 7411*b* to 7422*b* extends along the radial direction seen from the center of the magnetic material plate 74.

The magnetic material plate 74 is arranged on the stator 65 such that the second magnetic members 7411 to 7414, 7415 to 7418, and 7419 to 7422 cover the magnetic cores 111 to 114, 121 to 124, and 131 to 134, respectively.

The area of a surface 7411*a* of the second magnetic material 7411 on the opposite side to the magnetic core 111 is larger than the area of a surface 111*b* of the magnetic core 111 on the side of the second magnetic material 7411. In FIG. 11, the surfaces 7411*a* and 111*b* are not shown, neither are surfaces 7412*a* to 7422*a*, 112*b* to 114*b*, 121*b* to 124*b*, and 131*b* to 134*b* described later.

The areas of the surfaces 7412*a* to 7414*a*, 7415*a* to 7418*a*, and 7419*a* to 7422*a* of the second magnetic members 7412 to 7414, 7415 to 7418, and 7419 to 7422 on the opposite side to the magnetic cores 112 to 114, 121 to 124, and 131 to 134 are also larger than the areas of the surfaces 112*b* to 114*b*, 121*b* to 124*b*, and 131*b* to 134*b* of the magnetic cores on the side of the second magnetic members, respectively.

As the areas of the surfaces 7411*a* to 7422*a* of the second magnetic members are larger than the areas of the surfaces 111*b* to 114*b*, 121*b* to 124*b*, and 131*b* to 134*b* of the magnetic cores, the covering with the magnetic material plate 74 allows most of the magnetic flux to be introduced to the magnetic cores 111 to 114, 121 to 124, and 131 to 134. Further, magnetic resistance increases in the gaps 7411*b* to 7422*b*. This reduces the flow of magnetic flux from one of the second magnetic members to another of the second magnetic members by a short circuit.

FIG. 11 also shows rotors 31 and 32. The rotor 31 has a similar structure to that of the second preferred embodiment, and is arranged to face the magnetic material plate 74 from the opposite side to the magnetic material plate 72. FIG. 12 illustrates a side of the motor having the rotors 31 and 32 arranged on the stator 65.

The rotor 32 includes a substrate 611, magnets 6111 to 6114, and a magnetic material plate 75. The substrate 611 is rotatable about the rotation axis 92 along the prescribed direction 91, and is arranged to face the magnetic material plate 71 from the opposite side to the magnetic material plate 71. In this case, the aforementioned plate 611 is employed for the substrate of the rotor 32.

The magnets 6111 to 6114 are arranged on a surface of the substrate 611 on the side of the magnetic material plate 74, to face the magnetic material plate 74. More specifically, the magnets 6111 to 6114 each have a magnetic pole on the side of the magnetic material plate 74, with the polarities of magnetic poles varying between adjacent magnets. The rotor 32 rotates when magnetic flux generated by the stator 65 acts on the magnets 6111 to 6114.

The magnetic material plate 75 has a plurality of third magnetic members 751 to 754 arranged circularly in this order, and each one of the third magnetic members 751 to 754 has one of gaps 751*b* to 754*b* with another one of the third magnetic members. More specifically, the third magnetic material 751 has the gap 751*b* with its adjacent third magnetic material 752. The third magnetic members 752 to 754 have the gaps 752*b* to 754*b* in the same fashion.

The magnetic material plate 75 covers the magnets 6111 to 6114 from the opposite side to the substrate 611. More specifically, the third magnetic members 751 to 754 cover the magnets 6111 to 6114, respectively, to arrange the magnetic material plate 75 on the substrate 611. The magnetic material plate 75 faces the magnetic material plate 74 with gaps between them.

Because the magnets 6111 to 6114 exhibit a plurality of magnetic poles facing the second magnetic members 7411 to 7422, it can be understood that, with respect to each one of the magnetic poles, one of the third magnetic members 751 to 754 covers the one of the magnetic poles from the side of the second magnetic members 7411 to 7422, to face the second magnetic members 7411 to 7422.

According to the motor having the rotors 31 and 32 arranged on the stator 65, most of magnetic flux flowing from the rotors 31 and 32 is introduced to the magnetic cores 111 to 114, 121 to 124, and 131 to 134 via the magnetic material plates 72 and 75. This allows the magnetic flux to be interlinked efficiently to the coils A11 to A13 and B11 to B13.

Further, the magnetic material plates 72 and 75 include the gaps 721*b* to 724*b* and 751*b* to 754*b*, respectively. Magnetic resistance increases in the gaps 721*b* to 724*b* and 751*b* to 754*b*. This reduces the flow of magnetic flux from one of the magnets to another of the magnets via the magnetic material plates 72 and 75 by a short circuit in the same rotors 31 and 32.

Further, with the rotor 32 arranged on the stator 65 on the opposite side to the rotor 31, drive efficiency or drive output of the motor are high compared to the motor according to the second preferred embodiment.

Like the magnetic material plate 73 explained in the third preferred embodiment, it is desirable that the outlines of the gaps 7111*b* to 7122*b* and 7411*b* and 7422*b* of the magnetic material plates 71 and 74, respectively, be inclined (FIG. 6) in terms of reducing cogging torque.

Also, like the magnetic material plate 72 explained in the third preferred embodiment, it is desirable that the outlines of the gaps 721*b* to 724*b* and 751*b* and 754*b* of the magnetic material plates 72 and 75, respectively, be inclined (FIGS. 7 and 8) in terms of reducing cogging torque.

Sixth Preferred Embodiment

Figure 13:
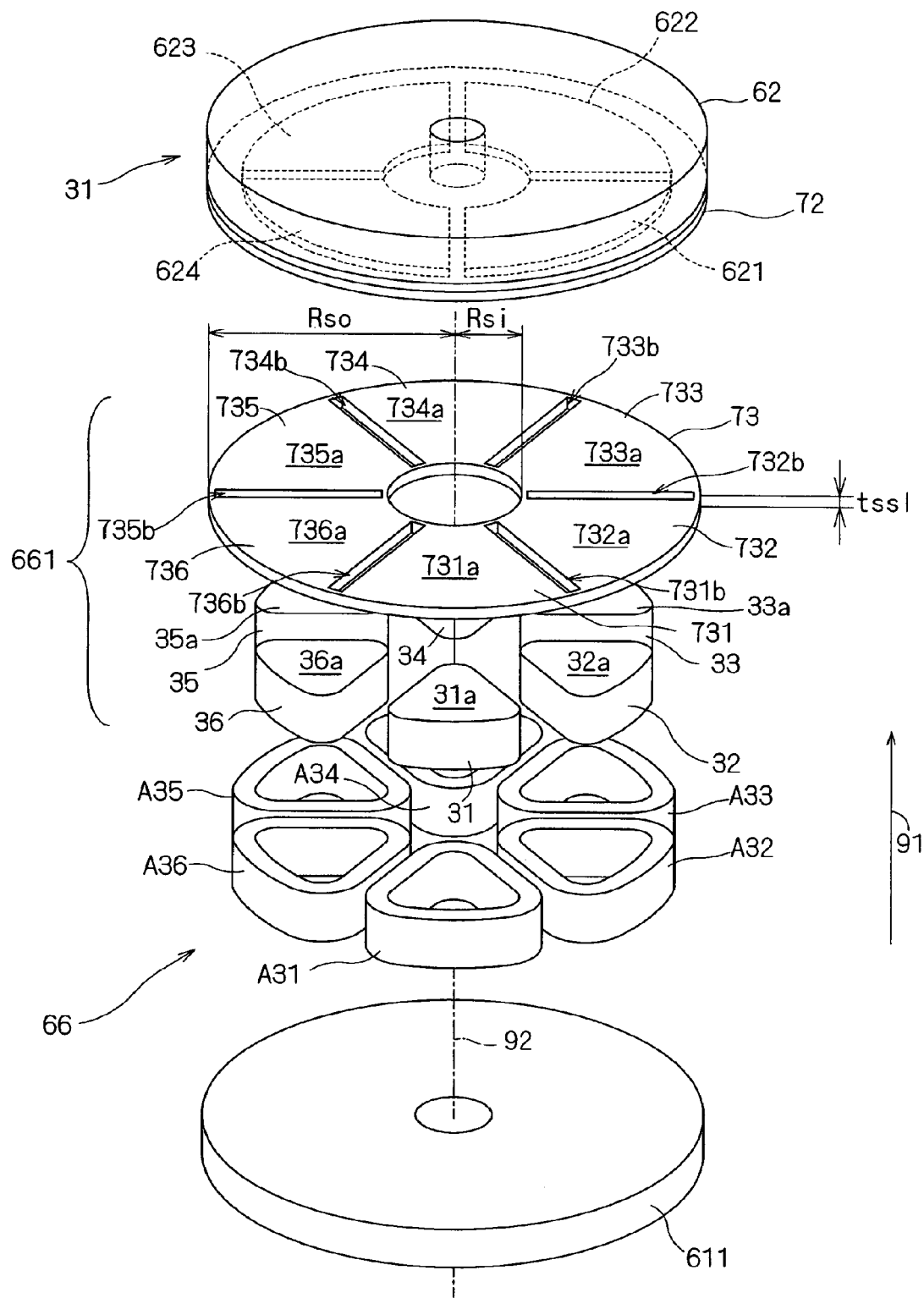
FIG. 13 is a perspective view schematically illustrating a stator 66 described in a sixth preferred embodiment.

FIG. 13 schematically illustrates a stator 66 according to this embodiment. It is shown as disassembled along the prescribed direction 91. The stator 66 includes a core 661 and the coils A31 to A36.

The core 661 includes the magnetic material plate 73 and the plurality of magnetic cores 31 to 36. The magnetic material plate 73 has a similar structure to that of the third preferred embodiment, and is vertical to the prescribed direction 91.

The magnetic cores 31 to 36 project on the surfaces of the first magnetic members 731 to 736 toward the opposite side to the prescribed direction 91. In each one of the first magnetic members 731 to 736, the areas of the surfaces 731*a* to 736*a* of the first magnetic members 731 to 736 on the opposite side to the magnetic cores 31 to 36 are larger than the areas of the cross sections 31*a* to 36*a* of the magnetic cores 31 to 36 covered with the first magnetic members 731 to 736 on the side of the first magnetic members 731 to 736.

The coils A31 to A36 are arranged around the magnetic cores 31 to 36 from the opposite side to the prescribed direction 91 with respect to the core 661, namely, the opposite side to the magnetic material plate 73 with respect to the magnetic cores 31 to 36.

The coils A31 to A36 may be arranged by employing the winding or the fitting of coils wound in advance as described in the first preferred embodiment. The latter case is shown in FIG. 13.

In addition, the coils A31 to A36 may be individually surrounded by insulators as in the first preferred embodiment, and a round line or a rectangular line may be employed for each of the coils.

According to the technique regarding the stator 66 discussed above, most of magnetic flux can be introduced to the magnetic cores 31 to 36, and the flow of magnetic flux from one of the first magnetic members to another of the first magnetic members by a short circuit is prevented, as in the third preferred embodiment. Further, because a side of the magnetic cores 31 to 36 on the opposite side to the magnetic material plate 73 is open, the coils A31 to A36 can be arranged easily around the magnetic cores 31 to 36.

In FIG. 10, the plate 611 is arranged on the stator 66 from the opposite side to the magnetic material plate 71, and the rotor 31 is also arranged as in the third preferred embodiment.

Figure 14:
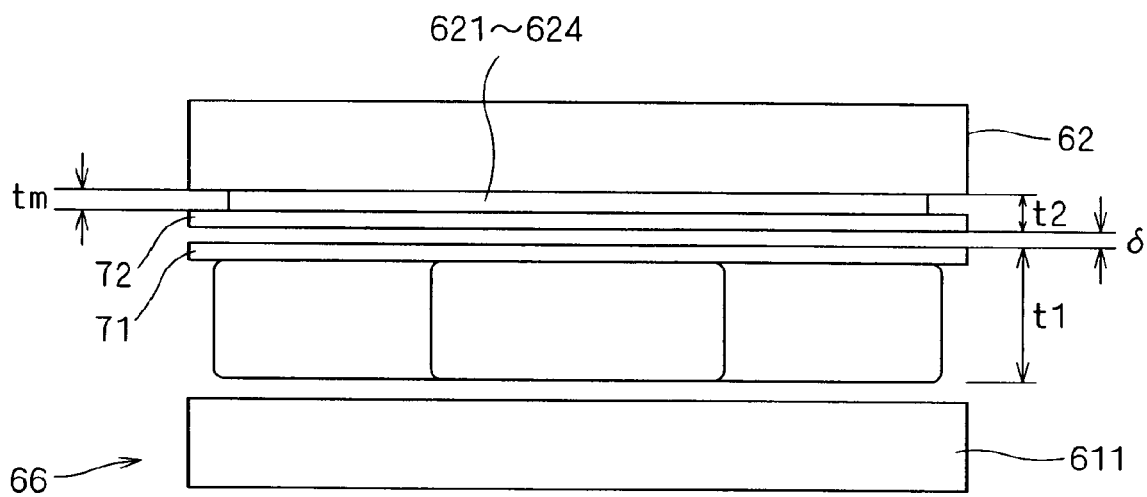
FIG. 14 is a side view schematically illustrating a motor.

As in the fourth preferred embodiment, the plate 611 may cover the stator 66 from the opposite side to the magnetic material plate 73 (first mode), or may be arranged to be rotatable about the rotation axis 92 along the prescribed direction 91 at a position of the rotor 66 on the opposite side to the magnetic material plate 73 (second mode). According to the first and second modes, the same effects can be obtained as those of the fourth preferred embodiment, respectively. FIG. 14 illustrates a side of the motor obtained in the second mode.

Also, as in the fifth preferred embodiment, a magnetic material plate having a similar structure to the magnetic material plate 73 may cover the stator 66 from the opposite side to the magnetic material plate 73 in the second mode of this embodiment as well. Alternatively, the rotor may be arranged from the opposite side to the magnetic material plate 73, to face this magnetic material plate.

Like the magnetic material plate 73 explained in the third preferred embodiment, it is desirable that the outlines of the gaps 731b to 736b of the magnetic material plate 73 be inclined (FIG. 6) in the motor according to this embodiment in terms of reducing cogging torque.

Also, like the magnetic material plate 72 explained in the third preferred embodiment, it is desirable that the outlines of the gaps 721b to 724b of the magnetic material plate 72 be inclined (FIGS. 7 and 8) in terms of reducing cogging torque.

In any of the preferred embodiments thus described, an iron core, for example, may be employed for the magnetic cores 111 to 114, 121 to 124, 131 to 134, and 31 to 36, and the magnetic material plates 71 to 75.

A dust core may be employed for the magnetic core. With a dust core, the iron loss of the dust core is small when the magnetic flux flows in any direction. The generation of eddy current is thus suppressed compared to when electromagnetic steel plates or the like are laminated in the direction of the rotation axis 92, thereby noticeably reducing iron loss. Particularly for the magnetic cores 111 to 114, 121 to 124, 131 to 134, and 31 to 36 and the magnetic material plates 71 to 75, in which the magnetic flux flows in the prescribed direction 91, it is desirable to employ a dust core than to laminate electromagnetic steel plates in the prescribed direction 91 in terms of noticeably reducing iron loss.

Moreover, the magnetic core is molded easily even when having an intricate shape, with density that is easily rendered uniform when molding the magnetic core. In addition, with insulation properties possessed by a dust core, insulation is easily ensured with the coils, for example.

Figure 15:
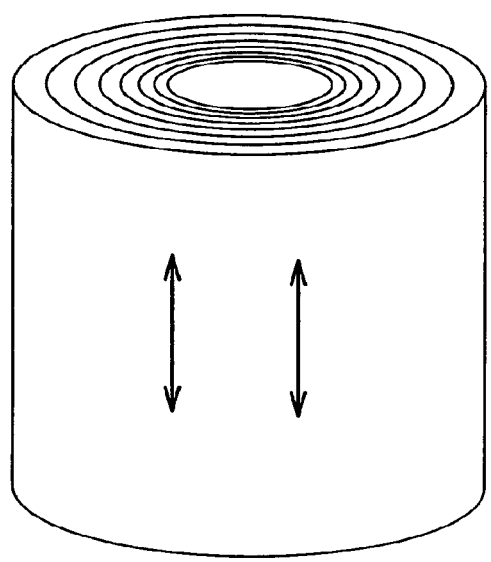
FIG. 15 is a perspective view schematically illustrating a wound core.
Figure 16:
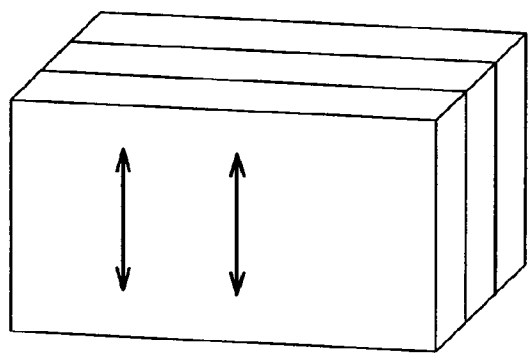
FIG. 16 is a perspective view schematically illustrating a laminated core.

For the magnetic core, a wound iron core may be employed which is wound with electromagnetic steel plates around a center line along the prescribed direction 91, or a laminated iron core may be employed which has electromagnetic steel plates laminated in a direction vertical to the prescribed direction 91. With a wound iron core and a laminated iron core, magnetic flux is more likely to flow in the prescribed direction 91. FIG. 15 illustrates a wound iron core and FIG. 16 illustrates a laminated iron core, respectively. While nondirectional electromagnetic steel plates may be employed for the electromagnetic steel plates, it is desirable to employ directional electromagnetic steel plates in which a direction with strong magnetic characteristics is along the prescribed direction 91. The reason is that since the magnetic flux flows mainly in the prescribed direction 91, the employment of such plates improves magnetic permeability and saturation magnetic flux density compared to those when nondirectional electromagnetic steel plates are employed, thereby reducing copper loss and further reducing iron loss in some members.

In any of the manufacturing techniques thus described, accuracy in manufacturing the rotors 63 to 66 can be obtained by using a jig, for example. However, the accuracy is improved easily by using a jig in the mode where the plate 61 or 611 covers the rotor after the coils have been arranged (the first mode in the fourth and sixth preferred embodiments), and is improved further easily by molding the magnetic material plate 71 and the magnetic cores in one piece.

When fixing the stator 65 or 66 described in the fourth preferred embodiment or this embodiment inside a case made out of a magnetic material, for example, it is undesirable to hold the stator 65 or 66 by fixing the outer circumference of the magnetic material plate 71 or 73 to the inner circumference of the case because the magnetic flux will leak from the magnetic material plate 71 or 73 to the case, to reduce the interlinked magnetic flux. The magnetic flux will not leak when the stator 65 or 66 is fixed to the inner circumference of a case made out of a non-magnetic material.

Thus, the magnetic flux leakage can be prevented by molding the whole of the stator 65 or 66 or the outside of a coil by resin. Alternatively, the outer circumference of the magnetic material plate 71 or 73 may be fixed to the inner circumference of a case via a ring made out of a non-magnetic material such as resin and aluminum. Further, a magnetic core wound with coils of the same phase in the same direction may be extended and fixed to the inner circumference of a case.

Seventh Preferred Embodiment

A description is given about the relationship between an outside diameter $R_{so}$ of the magnetic material plates 71 and 73 on a stator side and an outside diameter $R_{ro}$ of the magnetic material plate 72 on a rotor side (FIGS. 2, 4, 10 and 13). This relationship also applies to the relationship between the magnetic material plate 74 and the magnetic material plate 75.

It is desirable that the absolute value $|R_{so}-R_{ro}|$ of a difference between the outside diameter $R_{so}$ and the outside diameter $R_{ro}$ be smaller than a distance t1 (FIGS. 3, 5, 12 and 14) from the surface of the magnetic material plates 71 and 73 on the side of the magnetic material plate 72 to the end of the magnetic cores on the opposite side to the magnetic material plates 71 and 73, in terms of the following respect. Namely, the magnetic flux generated by the magnetic cores 111 to 114, 121 to 124, 131 to 134, and 31 to 36 is prevented from flowing by a short circuit in the stators 63 and 64 via the outer circumference side of the magnetic material plates 71 and 73. This is because as the distance from one magnetic material to another magnetic material (which excludes the distances of portions of the magnetic members) decreases in magnetic members such as the magnetic material plates 71 to 73 and the magnetic cores 111 to 114, 121 to 124, 131 to 134, and 31 to 36, magnetic resistance decreases to facilitate flow of the magnetic flux. The same holds for the following cases.

It is also desirable that the absolute value $|R_{so}-R_{ro}|$ be smaller than a distance t2 (FIGS. 3, 5, 12 and 14) from the surface of the magnetic material plate 72 on the side of the magnetic material plates 71 and 73 to the surface of the magnets 621 to 624 on the opposite side to the magnetic material plate 72, in terms of preventing the magnetic flux generated by the magnets 621 to 624 from flowing by a short circuit in the rotor via the outer circumference side of the magnetic material plate 72.

A description is given about the relationship between an inside diameter $R_{si}$ of the magnetic material plates 71 and 73 on a stator side and an inside diameter $R_{ri}$ of the magnetic material plate 72 on a rotor side (FIGS. 2, 4, 10 and 13).

It is desirable that the absolute value $|R_{si}-R_{ri}|$ of a difference between the inside diameter $R_{si}$ and the inside diameter $R_{ri}$ be smaller than the distance t1, in terms of preventing the magnetic flux generated by the magnetic cores 111 to 114, 121 to 124, 131 to 134, and 31 to 36 from flowing by a short circuit in the stators 63 and 64 via the inner circumference side of the magnetic material plates 71 and 73.

It is also desirable that the absolute value $|R_{si}-R_{ri}|$ be smaller than the distance t2, in terms of preventing the magnetic flux generated by the magnets 621 to 624 from flowing by a short circuit in the rotor via the inner circumference side of the magnetic material plate 72.

It is desirable that a width tssl (FIGS. 2 and 10) of the gaps 711lb to 7122b of the magnetic material plate 71 be larger than twice a distance δ(FIGS. 3 and 12) between surfaces of the magnetic material plates 71 and 72, the surfaces being closer ones to each other. The reason is that the magnetic flux is prevented from being short-circuited from one of the first magnetic members 7111 to 7122 to another via the gaps 7111b to 7122b between the first magnetic members adjacent to each other on the magnetic material plate 71. This is because magnetic resistance is smaller when the magnetic flux flows from one of the first magnetic members 7111 to 7122 to its adjacent one of the first magnetic members on the magnetic material plate 71 via the magnetic material plate 72 than when via the gaps 7111b to 7122b. The same holds for a width tssl (FIGS. 4 and 13) of the gaps 731b to 736b of the magnetic material plate 73 (FIGS. 5 and 14)

The aforementioned distance δ can be understood as a distance between a surface of the first magnetic members 7111 to 7122 and 731 to 736 on the magnetic material plates 71 and 73 and a surface of the second magnetic members 721 to 724 on the magnetic material plate 72, the surfaces being closer ones to each other.

It is desirable that a width trsl (FIGS. 2 and 10) of the gaps 721b to 724b of the magnetic material plate 72 be larger than twice the distance δ. The reason is that the magnetic flux is prevented from being short-circuited from one of the fourth magnetic members 721 to 724 to another via the gaps 721b to 724b between the fourth magnetic members adjacent to each other on the magnetic material plate 72. This is because magnetic resistance is smaller when the magnetic flux flows from one of the fourth magnetic members 721 to 724 to its adjacent one of the fourth magnetic members on the magnetic material plate 72 via the magnetic material plate 71 than when via the gaps 721b to 724b.

It is desirable that a thickness tm (FIGS. 3, 5, 12 and 14) of the magnets 621 to 624 of the rotor in the direction of the rotation axis 92 be larger than twice the distance δ. The reason is that the magnetic flux generated by the magnets 621 to 624 is prevented from being short-circuited between magnets of the same magnetic pole via the side surfaces thereof. This is because magnetic resistance is smaller when the magnetic flux flows from one end of one of the magnets 621 to 624 to another magnet via the magnetic material plate 71 than when the magnetic flux flows from one end of one of the magnets 621 to 624 on the side of the magnetic material plate 72 to the other end via the side surface thereof.

Figure 18:
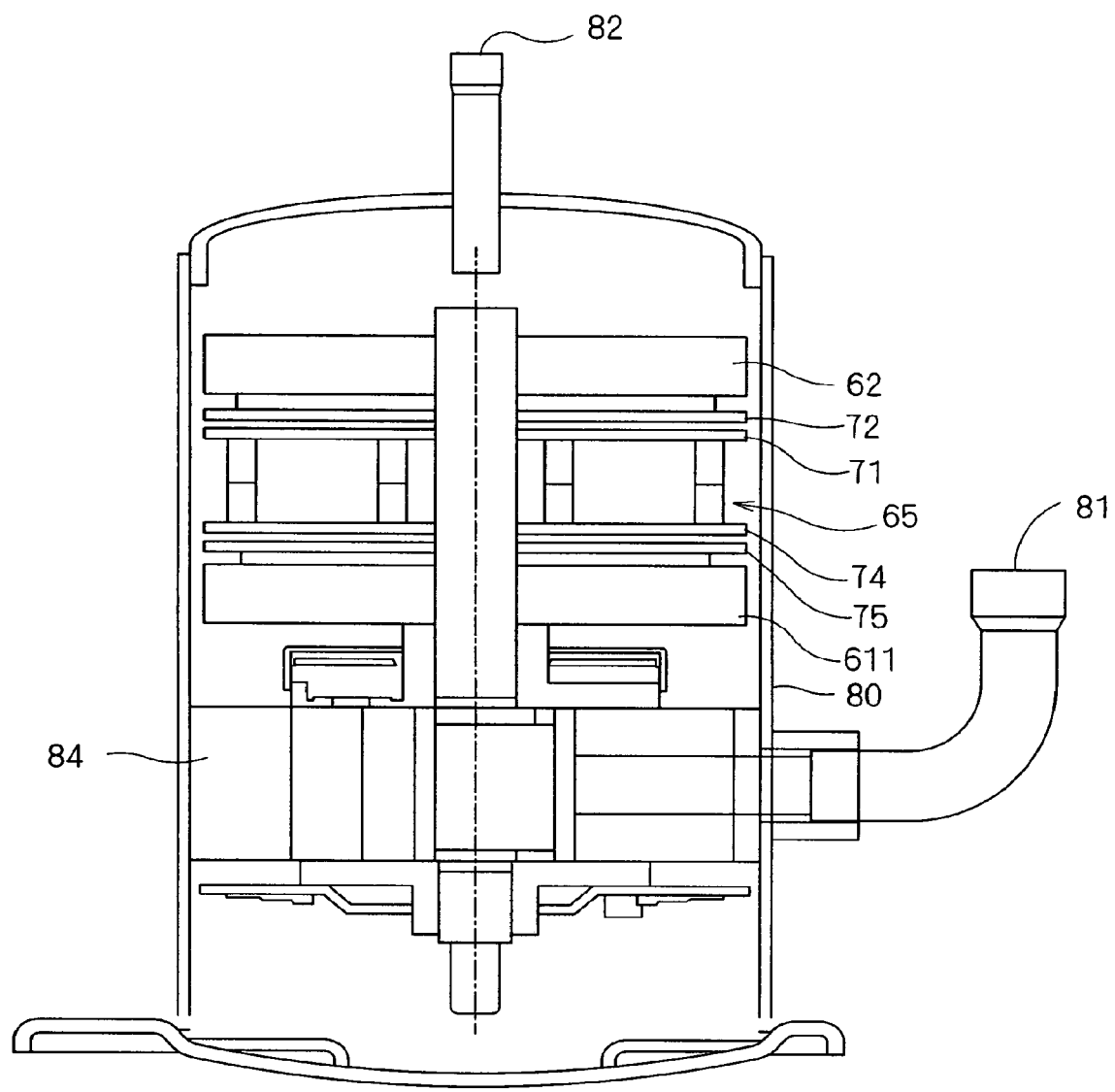
Figure 19:
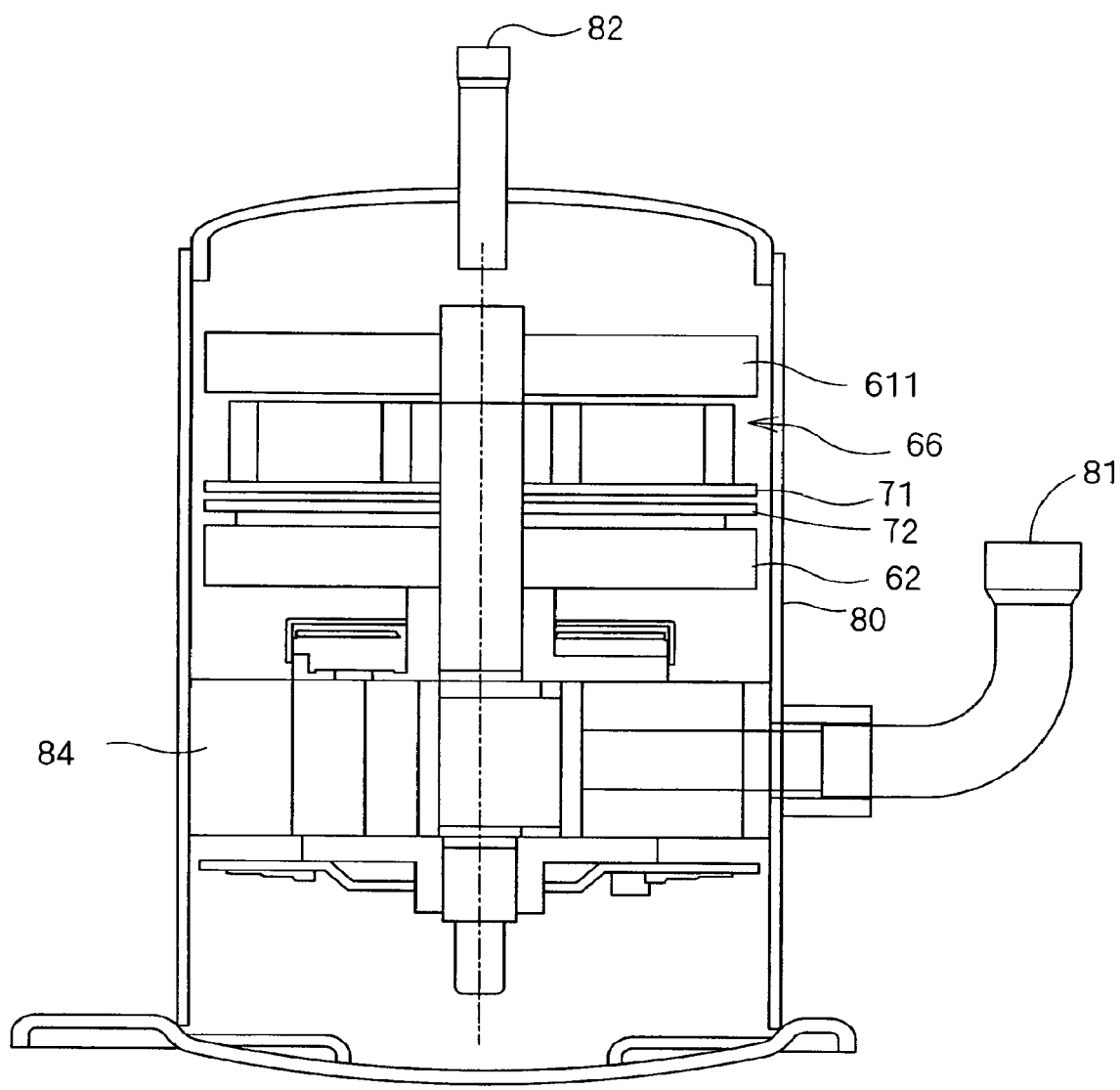

All of the motors described above can be mounted on a compressor, for example. By way of example, FIG. 17 shows the cross section of a compressor having the motor according to the third preferred embodiment mounted thereon. FIGS. 18 and 19 show the cross sections of compressors having the motors according to the fifth and sixth preferred embodiments mounted thereon, respectively. The compressor shown in FIG. 17 will particularly be described below.

The compressor includes a cylindrical case 80, a suction pipe 81 and a discharge pipe 82. The suction pipe 81 is connected to a side surface of the case 80, for example. The discharge pipe 82 is positioned on the opposite side to the suction pipe 81 with respect to the motor.

The case 80 includes a compression section 84, the motor, and a balance weight 83. The rotation axis 92 of the motor extends along the direction in which the case 80 extends.

The balance weight 83 is placed in the vicinity of the outside diameter on a surface of the rotor on the opposite side to the stator 64, for example, which case is shown in FIG. 17. Instead of placing the balance weight 83, a hole (which can be understood as a negative balance weight) may be provided on the side of the stator 64 of the substrate 62 of the rotor. In addition to providing the balance weight, it is desirable to increase the outside diameter of a portion of the magnetic material plate 72 on the opposite side to the balance weight 83 with respect to the rotation axis 92.

A refrigerant sucked through the suction pipe 81 is compressed at the compression section 84 by driving the motor. The compressed refrigerant is discharged from the discharge pipe 82.

According to this compressor, a refrigerant and the like can be compressed efficiently. Further, since a gap between the stator 64 and the rotor is vertical to the rotation axis 92, discharge of oil such as lubricating oil inside the compressor from the discharge pipe 82 and agitation of oil are reduced.

In addition, oil which has adhered to the rotor moves to sidewalls of the compressor by centrifugal force when the rotor rotates. Thus when the discharge pipe 82 is provided vertically above the motor, the oil moves vertically downward along the sidewalls, thereby preventing the oil from moving to the side of the discharge pipe 82.

Moreover, since the balance weight 83 is placed in the vicinity of the outside diameter on the surface of the rotor, the thickness of the balance weight 83 in the direction of the rotation axis 92 can be reduced, thereby reducing the size of the compressor.

All of the motors described above can be mounted on an air conditioner, to be used for rotating a fan. More specifically, the rotors 31 and 32, or the plate 611 in the second mode explained in the fourth and sixth preferred embodiments are provided with a fan.

Furthermore, the motors can be mounted on an automobile to rotate wheels.

While the invention has been shown and described in detail, the foregoing description is in all aspects illustrative and not restrictive. It is therefore understood that numerous modifications and variations can be devised without departing from the scope of the invention.

What is claimed is:

1. An armature comprising:
a magnetic material plate having a plurality of first magnetic members arranged circularly;
a plurality of magnetic cores; and
coils, wherein
in each one of said first magnetic members, one of said magnetic cores projecting toward the opposite side to one direction on a surface of said one of said first magnetic members, which has a surface on the opposite side to one of said magnetic cores on which said one of said first magnetic materials is arranged, whose area is larger than the area of a cross section of said one of said magnetic cores on the side of said one of said first magnetic members, and has a cavity with another one of said first magnetic members,
the outline of each of said cavities between said first magnetic members adjacent to each other in a circular direction extends from an inner circumference side to an outer circumference side of said magnetic material plate, and
said coils are arranged around said magnetic cores along said surface,
said armature further comprising
a plate arranged to cover said magnetic cores from the opposite side to said one direction, wherein
said plate is a second magnetic material plate having a plurality of second magnetic members arranged circularly,
each one of said second magnetic members has a cavity with another one of said second magnetic members,
the outline of said cavity between said second magnetic members adjacent to each other in a circular direction extends from an inner circumference side to an outer circumference side of said second magnetic material plate,
said second magnetic material plate is arranged such that each of said magnetic cores is covered with said second magnetic members, and
the area of a surface on the opposite side to one of said magnetic cores covered by said one of said second magnetic members is larger than the area of a surface of said one of said magnetic cores on the side of said one of said second magnetic members.

2. The armature according to claim 1, wherein each of said outlines extends in a direction inclined relative to the radial direction seen from the center of said second magnetic material plate.

3. A motor comprising:
the armature according to claim 1; and
magnets rotatable about a rotation axis along said one direction, said magnets being arranged to face said second magnetic members from the opposite side to said magnetic cores, and having a plurality of magnetic poles facing said second magnetic members.

4. The motor according to claim 3 further comprising
a plurality of third magnetic members, wherein
each one of said magnetic poles is covered with one of said third magnetic members to face said second magnetic members from the side of said second magnetic members, and
each one of said third magnetic members has a cavity with another one of said third magnetic members.

5. An armature comprising:
a magnetic material plate having a plurality of first magnetic members arranged circularly;
a plurality of magnetic cores; and
coils, wherein
each one of said first magnetic members has one of said magnetic cores projecting toward the opposite side to one direction on a surface of said one of said first magnetic members, has a surface on the opposite side to one of said magnetic cores on which said one of said first magnetic materials is arranged, whose area is larger than the area of a cross section of said one of said magnetic cores on the side of said one of said first magnetic members, and has a cavity with another one of said first magnetic members,
the outline of each of said cavities between said first magnetic members adjacent to each other in a circular direction extends from an inner circumference side to an outer circumference side of said magnetic material plate, and
said coils are arranged around said magnetic cores along said surface,
said armature further comprising
a plate arranged to be rotatable about a rotation axis along said one direction on the opposite side to said one direction of said magnetic cores.

6. The armature according to claim 5, wherein said plate is made out of a magnetic material.

7. A motor comprising:
the armature according to claim 5; and
magnets rotatable about a rotation axis along said one direction, said magnets facing said first magnetic members from the opposite side to said magnetic cores, and having a plurality of magnetic poles facing said first magnetic members.

8. The motor according to claim 7, further comprising
a plurality of fourth magnetic members, wherein
each one of said magnetic poles is covered with one of said fourth magnetic members to face said first magnetic members from the side of said first magnetic members, and
each one of said fourth magnetic members has a cavity with another one of said fourth magnetic members.

9. A compressor having the motor according to claim 7 mounted thereon.

10. A motor comprising:
the armature according to claim 2; and
magnets rotatable about a rotation axis along said one direction, said magnets facing said first magnetic members from the opposite side to said magnetic cores, and having a plurality of magnetic poles facing said first magnetic members.

* * * * *